US008370355B2

(12) United States Patent
Harger et al.

(10) Patent No.: US 8,370,355 B2
(45) Date of Patent: Feb. 5, 2013

(54) MANAGING ENTITIES WITHIN A DATABASE

(75) Inventors: Douglas Scott Harger, Spicewood, TX (US); Erik Jones, Phoenix, AZ (US); Edward Seabolt, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 12/056,720

(22) Filed: Mar. 27, 2008

(65) Prior Publication Data
US 2008/0243885 A1 Oct. 2, 2008

Related U.S. Application Data

(60) Provisional application No. 60/920,758, filed on Mar. 29, 2007.

(51) Int. Cl.
*G06F 17/30* (2006.01)
(52) U.S. Cl. .................................. 707/737; 709/238
(58) Field of Classification Search .................. 707/616, 707/640, 641, 624–627, 713–714, 737–740, 707/700, 741, 747, 235, 238, 245–247, 214, 707/219; 709/224–226, 214, 219, 200, 245, 709/246, 235, 238; 706/15, 45
See application file for complete search history.

(56) References Cited

U.S. PATENT DOCUMENTS

| 4,531,186 A | 7/1985 | Knapman |
|---|---|---|
| 5,020,019 A | 5/1991 | Ogawa |
| 5,134,564 A | 7/1992 | Dunn et al. |
| 5,247,437 A | 9/1993 | Vale et al. |
| 5,321,833 A | 6/1994 | Chang et al. |
| 5,323,311 A | 6/1994 | Fukao et al. |
| 5,333,317 A | 7/1994 | Dann |
| 5,381,332 A | 1/1995 | Wood |
| 5,442,782 A | 8/1995 | Malatesta et al. |
| 5,497,486 A | 3/1996 | Stolfo et al. |
| 5,535,322 A | 7/1996 | Hecht |
| 5,535,382 A | 7/1996 | Ogawa |

(Continued)

FOREIGN PATENT DOCUMENTS

| WO | 9855947 A1 | 12/1998 |
|---|---|---|
| WO | 0159586 | 8/2001 |

(Continued)

OTHER PUBLICATIONS

International Search Report and Written Opinion for PCT/US08/58404, Dated Aug. 15, 2008.

(Continued)

*Primary Examiner* — Wilson Lee
(74) *Attorney, Agent, or Firm* — Elissa Y. Wang; Edell, Shapiro & Finnan, LLC

(57) ABSTRACT

Embodiments of a method for managing entities include candidate selection by a transitive bucketing process where at least one attribute of an initial data record is used to determine a set of candidate data records corresponding to the initial data record. For each candidate data record thus determined, additional candidate data record(s) may be determined using attribute(s) not used in linking the candidate data record to the initial data record. This process may be repeated until no more candidate data records are returned. The initial data record and related candidates thus determined are then resolved into group entities, each having member records that match one another above a certain threshold. If no match is found, a group entity comprising a single data record may be created. These group entities are then reconciled with other entities in a master entity index system.

28 Claims, 13 Drawing Sheets

U.S. PATENT DOCUMENTS

| | | |
|---|---|---|
| 5,537,590 A | 7/1996 | Amado |
| 5,555,409 A | 9/1996 | Leenstra et al. |
| 5,561,794 A | 10/1996 | Fortier |
| 5,583,763 A | 12/1996 | Atcheson et al. |
| 5,600,835 A | 2/1997 | Garland et al. |
| 5,606,690 A | 2/1997 | Hunter et al. |
| 5,615,367 A | 3/1997 | Bennett et al. |
| 5,640,553 A | 6/1997 | Schultz |
| 5,651,108 A | 7/1997 | Cain et al. |
| 5,675,752 A | 10/1997 | Scott et al. |
| 5,675,753 A | 10/1997 | Hansen et al. |
| 5,694,593 A | 12/1997 | Baclawski |
| 5,694,594 A | 12/1997 | Chang |
| 5,710,916 A | 1/1998 | Barbara et al. |
| 5,734,907 A | 3/1998 | Jarossay et al. |
| 5,765,150 A | 6/1998 | Burrows |
| 5,774,661 A | 6/1998 | Chatterjee |
| 5,774,883 A | 6/1998 | Andersen |
| 5,774,887 A | 6/1998 | Wolff et al. |
| 5,778,370 A | 7/1998 | Emerson |
| 5,787,431 A | 7/1998 | Shaughnessy |
| 5,787,470 A | 7/1998 | DeSimone et al. |
| 5,790,173 A | 8/1998 | Strauss |
| 5,796,393 A | 8/1998 | MacNaughton et al. |
| 5,805,702 A | 9/1998 | Curry |
| 5,809,499 A | 9/1998 | Wong et al. |
| 5,819,264 A | 10/1998 | Palmon et al. |
| 5,835,712 A | 11/1998 | DuFresne |
| 5,835,912 A | 11/1998 | Pet |
| 5,848,271 A | 12/1998 | Caruso et al. |
| 5,859,972 A | 1/1999 | Subramaniam et al. |
| 5,862,322 A | 1/1999 | Anglin et al. |
| 5,862,325 A | 1/1999 | Reed et al. |
| 5,878,043 A | 3/1999 | Casey |
| 5,893,074 A | 4/1999 | Hughes et al. |
| 5,893,110 A | 4/1999 | Weber et al. |
| 5,905,496 A | 5/1999 | Lau et al. |
| 5,930,768 A | 7/1999 | Hooban |
| 5,960,411 A | 9/1999 | Hartman et al. |
| 5,963,915 A | 10/1999 | Kirsch |
| 5,987,422 A | 11/1999 | Buzsaki |
| 5,991,758 A | 11/1999 | Ellard |
| 5,999,937 A | 12/1999 | Ellard |
| 6,014,664 A | 1/2000 | Fagin et al. |
| 6,016,489 A | 1/2000 | Cavanaugh et al. |
| 6,018,733 A | 1/2000 | Kirsch et al. |
| 6,018,742 A | 1/2000 | Herbert, III |
| 6,026,433 A | 2/2000 | D'Arlach et al. |
| 6,049,847 A | 4/2000 | Vogt et al. |
| 6,067,549 A * | 5/2000 | Smalley et al. ............ 705/7 |
| 6,069,628 A | 5/2000 | Farry et al. |
| 6,078,325 A | 6/2000 | Jolissaint et al. |
| 6,108,004 A | 8/2000 | Medl |
| 6,134,581 A | 10/2000 | Ismael et al. |
| 6,185,608 B1 | 2/2001 | Hon et al. |
| 6,223,145 B1 | 4/2001 | Hearst |
| 6,269,373 B1 | 7/2001 | Apte et al. |
| 6,297,824 B1 | 10/2001 | Hearst et al. |
| 6,298,478 B1 | 10/2001 | Nally et al. |
| 6,311,190 B1 | 10/2001 | Bayer et al. |
| 6,327,611 B1 | 12/2001 | Everingham |
| 6,330,569 B1 | 12/2001 | Baisley et al. |
| 6,356,931 B2 | 3/2002 | Ismael et al. |
| 6,374,241 B1 | 4/2002 | Lamburt et al. |
| 6,385,600 B1 | 5/2002 | McGuinness et al. |
| 6,389,429 B1 | 5/2002 | Kane et al. |
| 6,446,188 B1 | 9/2002 | Henderson et al. |
| 6,449,620 B1 | 9/2002 | Draper |
| 6,457,065 B1 | 9/2002 | Rich et al. |
| 6,460,045 B1 | 10/2002 | Aboulnaga et al. |
| 6,496,793 B1 | 12/2002 | Veditz et al. |
| 6,502,099 B1 | 12/2002 | Rampy et al. |
| 6,510,505 B1 | 1/2003 | Burns et al. |
| 6,523,019 B1 | 2/2003 | Borthwick |
| 6,529,888 B1 | 3/2003 | Heckerman et al. |
| 6,556,983 B1 | 4/2003 | Altschuler et al. |
| 6,557,100 B1 | 4/2003 | Knutson |
| 6,621,505 B1 | 9/2003 | Beauchamp et al. |
| 6,633,878 B1 | 10/2003 | Underwood |
| 6,633,882 B1 | 10/2003 | Fayyad et al. |
| 6,633,992 B1 | 10/2003 | Rosen |
| 6,647,383 B1 | 11/2003 | August et al. |
| 6,662,180 B1 | 12/2003 | Aref et al. |
| 6,687,702 B2 | 2/2004 | Vaitheeswaran et al. |
| 6,704,805 B1 | 3/2004 | Acker et al. |
| 6,718,535 B1 | 4/2004 | Underwood |
| 6,742,003 B2 | 5/2004 | Heckerman et al. |
| 6,757,708 B1 | 6/2004 | Craig et al. |
| 6,795,793 B2 | 9/2004 | Shayegan et al. |
| 6,807,537 B1 | 10/2004 | Thiesson et al. |
| 6,842,761 B2 | 1/2005 | Diamond et al. |
| 6,842,906 B1 | 1/2005 | Bowman-Amuah |
| 6,879,944 B1 | 4/2005 | Tipping et al. |
| 6,907,422 B1 | 6/2005 | Predovic |
| 6,912,549 B2 | 6/2005 | Rotter et al. |
| 6,922,695 B2 | 7/2005 | Skufca et al. |
| 6,957,186 B1 | 10/2005 | Guheen et al. |
| 6,990,636 B2 | 1/2006 | Beauchamp et al. |
| 6,996,565 B2 | 2/2006 | Skufca et al. |
| 7,035,809 B2 | 4/2006 | Miller et al. |
| 7,043,476 B2 | 5/2006 | Robson |
| 7,099,857 B2 | 8/2006 | Lambert |
| 7,143,091 B2 | 11/2006 | Charnock et al. |
| 7,155,427 B1 | 12/2006 | Prothia |
| 7,181,459 B2 | 2/2007 | Grant et al. |
| 7,249,131 B2 | 7/2007 | Skufca et al. |
| 7,330,845 B2 | 2/2008 | Lee et al. |
| 7,487,173 B2 | 2/2009 | Medicke et al. |
| 7,526,486 B2 | 4/2009 | Cushman, II et al. |
| 7,567,962 B2 | 7/2009 | Chakrabarti et al. |
| 7,620,647 B2 | 11/2009 | Stephens et al. |
| 7,627,550 B1 | 12/2009 | Adams et al. |
| 7,685,093 B1 | 3/2010 | Adams et al. |
| 7,698,268 B1 | 4/2010 | Adams et al. |
| 7,788,274 B1 | 8/2010 | Ionescu |
| 8,321,383 B2 | 11/2012 | Schumacher et al. |
| 8,321,393 B2 | 11/2012 | Adams et al. |
| 2002/0007284 A1 | 1/2002 | Schurenberg et al. |
| 2002/0073099 A1 | 6/2002 | Gilbert et al. |
| 2002/0080187 A1 | 6/2002 | Lawton |
| 2002/0087599 A1 | 7/2002 | Grant et al. |
| 2002/0095421 A1 | 7/2002 | Koskas |
| 2002/0099694 A1 | 7/2002 | Diamond et al. |
| 2002/0152422 A1 | 10/2002 | Sharma et al. |
| 2002/0156917 A1 | 10/2002 | Nye |
| 2002/0178360 A1 | 11/2002 | Wenocur et al. |
| 2003/0004770 A1 | 1/2003 | Miller et al. |
| 2003/0004771 A1 | 1/2003 | Yaung |
| 2003/0018652 A1 | 1/2003 | Heckerman et al. |
| 2003/0023773 A1 | 1/2003 | Lee et al. |
| 2003/0051063 A1 | 3/2003 | Skufca et al. |
| 2003/0065826 A1 | 4/2003 | Skufca et al. |
| 2003/0065827 A1 | 4/2003 | Skufca et al. |
| 2003/0105825 A1 | 6/2003 | Kring et al. |
| 2003/0120630 A1 | 6/2003 | Tunkelang |
| 2003/0145002 A1 | 7/2003 | Kleinberger et al. |
| 2003/0158850 A1 | 8/2003 | Lawrence et al. |
| 2003/0174179 A1 | 9/2003 | Suermondt et al. |
| 2003/0182101 A1 | 9/2003 | Lambert |
| 2003/0195836 A1 | 10/2003 | Hayes et al. |
| 2003/0195889 A1 | 10/2003 | Yao et al. |
| 2003/0195890 A1 | 10/2003 | Oommen |
| 2003/0220858 A1 | 11/2003 | Lam et al. |
| 2003/0227487 A1 | 12/2003 | Hugh |
| 2004/0107189 A1 | 6/2004 | Burdick et al. |
| 2004/0107205 A1 | 6/2004 | Burdick et al. |
| 2004/0122790 A1 | 6/2004 | Walker et al. |
| 2004/0143477 A1 | 7/2004 | Wolff |
| 2004/0143508 A1 | 7/2004 | Bohn et al. |
| 2004/0181526 A1 | 9/2004 | Burdick et al. |
| 2004/0181554 A1 | 9/2004 | Heckerman et al. |
| 2004/0220926 A1 | 11/2004 | Lamkin et al. |
| 2004/0260694 A1 | 12/2004 | Chaudhuri et al. |
| 2005/0004895 A1 | 1/2005 | Schurenberg et al. |
| 2005/0015381 A1 | 1/2005 | Clifford et al. |
| 2005/0015675 A1 | 1/2005 | Kolawa et al. |
| 2005/0050068 A1 | 3/2005 | Vaschillo et al. |

| | | |
|---|---|---|
| 2005/0055345 A1 | 3/2005 | Ripley |
| 2005/0060286 A1 | 3/2005 | Hansen et al. |
| 2005/0071194 A1 | 3/2005 | Bormann et al. |
| 2005/0075917 A1 | 4/2005 | Flores et al. |
| 2005/0114369 A1 | 5/2005 | Gould et al. |
| 2005/0149522 A1 | 7/2005 | Cookson et al. |
| 2005/0154615 A1 | 7/2005 | Rotter et al. |
| 2005/0210007 A1 | 9/2005 | Beres et al. |
| 2005/0228808 A1 | 10/2005 | Mamou et al. |
| 2005/0240392 A1 | 10/2005 | Munro et al. |
| 2005/0256740 A1 | 11/2005 | Kohan et al. |
| 2005/0256882 A1 | 11/2005 | Able et al. |
| 2005/0273452 A1 | 12/2005 | Molloy et al. |
| 2006/0053151 A1 | 3/2006 | Gardner et al. |
| 2006/0053172 A1 | 3/2006 | Gardner et al. |
| 2006/0053173 A1 | 3/2006 | Gardner et al. |
| 2006/0053382 A1 | 3/2006 | Gardner et al. |
| 2006/0064429 A1* | 3/2006 | Yao .............................. 707/101 |
| 2006/0074832 A1 | 4/2006 | Gardner et al. |
| 2006/0074836 A1 | 4/2006 | Gardner et al. |
| 2006/0080312 A1 | 4/2006 | Friedlander et al. |
| 2006/0116983 A1 | 6/2006 | Dettinger et al. |
| 2006/0117032 A1 | 6/2006 | Dettinger et al. |
| 2006/0129605 A1 | 6/2006 | Doshi |
| 2006/0129971 A1 | 6/2006 | Rojer |
| 2006/0136205 A1 | 6/2006 | Song |
| 2006/0161522 A1 | 7/2006 | Dettinger et al. |
| 2006/0167896 A1 | 7/2006 | Kapur et al. |
| 2006/0179050 A1 | 8/2006 | Giang et al. |
| 2006/0190445 A1 | 8/2006 | Risberg et al. |
| 2006/0195560 A1 | 8/2006 | Newport |
| 2006/0265400 A1 | 11/2006 | Fain et al. |
| 2006/0271401 A1 | 11/2006 | Lassetter et al. |
| 2006/0271549 A1 | 11/2006 | Rayback et al. |
| 2006/0287890 A1 | 12/2006 | Stead et al. |
| 2007/0005567 A1 | 1/2007 | Hermansen et al. |
| 2007/0016450 A1 | 1/2007 | Bhora et al. |
| 2007/0055647 A1 | 3/2007 | Mullins et al. |
| 2007/0067285 A1 | 3/2007 | Blume et al. |
| 2007/0073678 A1 | 3/2007 | Scott et al. |
| 2007/0073745 A1 | 3/2007 | Scott et al. |
| 2007/0094060 A1 | 4/2007 | Apps et al. |
| 2007/0150279 A1 | 6/2007 | Gandhi et al. |
| 2007/0192715 A1 | 8/2007 | Kataria et al. |
| 2007/0198481 A1 | 8/2007 | Hogue et al. |
| 2007/0198600 A1* | 8/2007 | Betz .............................. 707/201 |
| 2007/0214129 A1 | 9/2007 | Ture et al. |
| 2007/0214179 A1 | 9/2007 | Hoang |
| 2007/0217676 A1 | 9/2007 | Grauman et al. |
| 2007/0250487 A1 | 10/2007 | Reuther |
| 2007/0260492 A1 | 11/2007 | Feied et al. |
| 2007/0276844 A1 | 11/2007 | Segal et al. |
| 2007/0276858 A1 | 11/2007 | Cushman et al. |
| 2007/0299697 A1 | 12/2007 | Friedlander et al. |
| 2007/0299842 A1 | 12/2007 | Morris et al. |
| 2008/0005106 A1 | 1/2008 | Schumacher et al. |
| 2008/0016218 A1 | 1/2008 | Jones et al. |
| 2008/0069132 A1 | 3/2008 | Ellard et al. |
| 2008/0120432 A1 | 5/2008 | Lamoureaux et al. |
| 2008/0126160 A1 | 5/2008 | Takuechi et al. |
| 2008/0243832 A1 | 10/2008 | Adams et al. |
| 2008/0244008 A1 | 10/2008 | Wilkinson et al. |
| 2009/0089317 A1 | 4/2009 | Ford et al. |
| 2009/0089332 A1 | 4/2009 | Harger et al. |
| 2009/0089630 A1 | 4/2009 | Goldenberg et al. |
| 2009/0198686 A1 | 8/2009 | Cushman, II et al. |
| 2010/0114877 A1 | 5/2010 | Adams et al. |
| 2010/0174725 A1 | 7/2010 | Adams et al. |
| 2010/0175024 A1 | 7/2010 | Schumacher et al. |
| 2011/0010214 A1 | 1/2011 | Carruth |
| 2011/0010346 A1 | 1/2011 | Goldenberg et al. |
| 2011/0010401 A1 | 1/2011 | Adams et al. |
| 2011/0010728 A1 | 1/2011 | Goldenberg et al. |
| 2011/0047044 A1 | 2/2011 | Wright et al. |
| 2011/0191349 A1 | 8/2011 | Ford et al. |

FOREIGN PATENT DOCUMENTS

| | | | |
|---|---|---|---|
| WO | 0159586 A2 | 8/2001 | |
| WO | 0175679 A1 | 10/2001 | |
| WO | 03021485 | 3/2003 | |
| WO | 2004023297 A1 | 3/2004 | |
| WO | 2004023311 A1 | 3/2004 | |
| WO | 2004023345 A1 | 3/2004 | |
| WO | 2009042931 A1 | 4/2009 | |
| WO | 2009042941 A1 | 4/2009 | |

OTHER PUBLICATIONS

Fair, "Record Linkage in the National Dose Registry of Canada", European Journal of Cancer, vol. 3, Supp. 3, pp. S37-S43, XP005058648 ISSN: 0959-8049, Apr. 1997.
International Search Report and Written Opinion, for PCT/US2007/012073, Mailed Jul. 23, 2008, 12 pages.
International Preliminary Report on Patentability Issued in PCT/US2007/013049, Mailed Dec. 17, 2008.
International Search Report and Written Opinion issued in PCT/US2007/013049, mailed Jun. 13, 2008.
Office Action issued in U.S. Appl. No. 11/809,792, mailed Aug. 21, 2009, 14 pages.
Oracle Date Hubs: "The Emperor Has No Clothes?", Feb. 21, 2005, Google.com, pp. 1-9.
IEEE, no matched results, Jun. 30, 2009, p. 1.
IEEE No matched Results, 1 Page, Sep. 11, 2009.
Office Action issued in U.S. Appl. No. 11/522,223 dated Aug. 20, 2008, 16 pgs.
Office Action issued in U.S. Appl. No. 11/522,223 dated Feb. 5, 2009, Adams, 17 pages.
Notice of Allowance issued for U.S. Appl. No. 11/522,223, dated Sep. 17, 2009, 20 pages.
De Rose, et al. "Building Structured Web Community Portals: A Top-Down, Compositional, and Incremental Approach", VDLB, ACM, pp. 399-410, Sep. 2007.
Microsoft Dictionary, "normalize", at p. 20, Fifth Edition, Microsoft Corp., downloaded from http://proquest. safaribooksonline.com/0735614954 on Sep. 8, 2008.
Office Action issued in U.S. Appl. No. 11/521,928, dated Apr. 1, 2009, 22 pages.
Office Action issued in U.S. Appl. No. 11/521,928 dated Sep. 16, 2008, 14 pages.
Notice of Allowance issued for U.S. Appl. No. 11/521,928, dated Sep. 18, 2009, 20 pages.
Gopalan Suresh Raj, Modeling Using Session and Entity Beans, Dec. 1998, Web Comucopia, pp. 1-15.
Scott W. Ambler, Overcoming Data Design Challenges, Aug. 2001, p. 1-3.
XML, JAVA and the future of the Web, Bosak, J., Sun Microsystems, Mar. 10, 1997, pp. 1-9.
Integrated Document and Workflow Management applied to Offer Processing a Maching Tool Company, Stefan Morschheuser, et al., Dept. of Information Systems I, COOCS '95 Milpitas CA, ACM 0-89791-706-5/95, p. 106-115.
Hamming Distance, HTML. Wikipedia.org, Available: http://en.wikipedia.org/wiki/Hamming_distance (as of May 8, 2008).
Office Action issued in U.S. Appl. No. 11/521,946, mailed May 14, 2008, 10 pgs.
Office Action issued in U.S. Appl. No. 11/521,946 mailed Dec. 9, 2008, 10 pgs.
Office Action issued in U.S. Appl. No. 11/521,946 mailed May 13, 2009, 12 pgs.
Freund et al., Statistical Methods, 1993, Academic Press Inc., United Kingdom Edition, pp. 112-117.
Waddington, D., "Does it signal convergence of operational and analytic MDM?" retrieved from the internet<URL: http://www.intelligententerprise.com>, 2 pages, Aug. 2006.
International Search Report mailed on Oct. 10, 2008, for PCT Application No. PCT/US07/20311 (10 pp).
International Search Report and Written Opinion issued in PCT/US07/89211, mailing date of Jun. 20, 2008.
International Preliminary Report on Patentability Under Chapter 1 for PCT Application No. PCT/US2008/058665, issued Sep. 29, 2009, mailed Oct. 8, 2009, 6 pgs.

International Search Report and Written Opinion mailed on Dec. 3, 2008 for International Patent Application No. PCT/US2008/077985.
Gu, Lifang, et al., "Record Linkage: Current Practice and Future Directions," CSIRO Mathematical and Informational Sciences, 2003, pp. 1-32.
O'Hara-Schettino, et al., "Dynamic Navigation in Multiple View Software Specifications and Designs," Journal of Systems and Software, vol. 41, Issue 2, May 1998, pp. 93-103.
International Search Report and Written Opinion mailed on Oct. 10, 2008 for PCT Application No. PCT/US08/68979.
International Search Report and Written Opinion mailed on Dec. 2, 2008 for PCT/US2008/077970.
Martha E. Fair, et al., "Tutorial on Record Linkage Slides Presentation", Chapter 12, pp. 457-479.
International Search Report and Written Opinion mailed on Aug. 28, 2008 for Application No. PCT/US2008/58665, 7 pgs.
C.C. Gotlieb, Oral Interviews with C.C. Gotlieb, Apr. 1992, May 1992, ACM, pp. 1-72.
Google.com, no match results, Jun. 30, 2009, p. 1.
Supplementary European Search Report for EP 07 79 5659 dated May 18, 2010, 5 pages.
European Communication for EP 98928878 (PCT/US9811438) dated Feb. 16, 2006.
European Communication for EP 98928878 (PCT/US9811438) dated Mar. 10, 2008.
European Communication for EP 98928878 (PCT/US9811438) dated Jun. 26, 2006.
Gill, "OX-Link: The Oxford Medical Record Linkage System", Internet Citation, 1997.
Newcombe et al., "The Use of Names for Linking Personal Records", Journal of the American Statistical Association vol. 87, Dec. 1, 1992, pp. 335-349.
European Communication for EP 07795659 (PCT/US2007013049) dated May 27, 2010.
Jason Woods, et al., "Baja Identity Hub Configuration Process", Publicly available on Apr. 2, 2009, Version 1.3.
Initiate Systems, Inc. "Refining the Auto-Link Threshold Based Upon Scored Sample", Publicly available on Apr. 2, 2009; memorandum.
Initiate Systems, Inc. "Introduction", "False-Positive Rale (Auto-Link Threshold)", Publicly available on Apr. 2, 2009; memorandum.
Jason Woods, "Workbench 8.0 Bucket Analysis Tools", Publicly available on Apr. 2, 2009.
"Parsing" Publicly available on Oct. 2, 2008.
Initiate, "Business Scenario: Multi-Lingual Algorithm and Hub," Publicly available on Apr. 2, 2009.
Initiate, "Business Scenario: Multi-Lingual & Many-To-Many Entity Solutions", Publicly available on Apr. 2, 2009.
Initiate, "Relationships-MLH", presentation; Publicly available on Sep. 28, 2007.
Initiate, "Multi-Lingual Hub Support viaMemtype Expansion", Publicly available on Apr. 2, 2009.
Initiate Systems, Inc. "Multi-Language Hubs", memorandum; Publicly available on Apr. 2, 2009.
Initiate, "Business Scenario: Support for Members in Multiple Entities", Publicly available on Oct. 2, 2008.
Initiate, "Group Entities", Publicly available on Mar. 30, 2007.
Jim Cushman, MIO 0.5: MIO As a Source; Initiate; Publicly available on Oct. 2, 2008.
Initiate, "Provider Registry Functionality", Publicly available on Oct. 2, 2008.
Edward Seabolt, "Requirement Specification Feature #NNNN Multiple Entity Relationship", Version 0.1-Draft; Publicly available on Oct. 2, 2008.
Initiate, "Arriba Training Engine Callouts", presentation; Publicly available on Mar. 30, 2007.
Initiate, "Business Scenario: Callout to Third Party System", Publicly available on Oct. 2, 2008.
John Dorney, "Requirement Specification Feature #NNNN Conditional Governance", Version 1.0-Draft; Publicly available on Oct. 2, 2008.
Initiate, Release Content Specification, Identity Hub Release 6.1, RCS Version 1.0; Publicly available on Sep. 16, 2005.
Initiate, "Initiate Identity Hub™ Manager User Manual", Release 6.1; Publicly available on Sep. 16, 2005,
End User Training CMT; CIO Maintenance Tool (CMT) Training Doc; Publicly available on Sep. 29, 2006.
"Hierarchy Viewer-OGT 3.0t", Publicly available on Sep. 25, 2008.
"Building and Searching the OGT", Publicly available on Sep. 29, 2006.
Sean Stephens, "Requirement Specification B2B Web Client Architecture", Version 0.1-Draft; Publicly available on Sep. 25, 2008.
"As of OGT 2.0", Publicly available on Sep. 29, 2006.
Initiate, "Memtype Expansion Detailed Design", Publicly available on Apr. 2, 2009.
Initiate, "Java SDK Self-Training Guide", Release 7.0; Publicly available on Mar. 24, 2006.
Ohgaya, Ryosuke et al., "Conceptual Fuzzy Sets-, NAFIPS 2002, Jun. 27-29, 2002, pp. 274-279. Based Navigation System for Yahoo!".
Xue, Gui-Rong et al., "Reinforcing Web-Object Categorization Through Interrelationships", Data Mining and Knowledge Discover, vol. 12, Apr. 4, 2006, pp. 229-248.
Adami, Giordano et al., "Clustering Documents in a Web Directory", WIDM '03, New Orleans, LA, Nov. 7-8, 2003, pp, 66-73.
Chen, Hao et al., "Bringing Order to the Web: Automatically Categorizing Search Results", CHI 2000, CHI Letters, vol. 2, Issue 1, Apr. 1-6, 2000, pp. 145-152.
"Implementation Defined Segments—Exhibit A", Publicly available on Mar. 20, 2008.
Initiate, "Implementation Defined Segments—Gap Analysis", Publicly available on Mar. 20, 2008.
"Supporting Hierarchies", Publicly available on Nov. 29, 2007.
Xue, Gui-Rong et al., "Implicit Link Analysis for Small Web Search", SIGIR '03, Toronto, Canada, Jul. 28-Aug. 1, 2003, pp. 56-63.
Liu, Fang et al., "Personalized Web Search for iMproving Retrieval Effectiveness", IEEE Transactions on Knowledge and Data Engineering vol. 16, No. 1, Jan. 2004, pp. 28-40.
Anyanwu, Kemafor et al. "SemRank: Ranking complex Relationship Search Results on the Semantic Web", WWW 2005, Chiba, Japan May 10-14, 2005, pp. 117-127.
International Preliminary Report on Patentability, PCT/US2008/58404, Mar. 21, 2011, 4 pages.
European Search Report/EP07795659.7, Apr. 15, 2011, 7 pages.
Emdad Ahmed, "A Survey on Bioinformatics Data and Service Integration Using Ontology and Declaration Workflow Query Language", Department of Computer Science, Wayne State University, USA, Mar. 15, 2007, pp. 1-67.
International Preliminary Report on Patentability, PCT/US2007/89211, Apr. 30, 2012, 6 pages.
European Search Report/EP07795108.5, May 29, 2012, 6 pages.

* cited by examiner

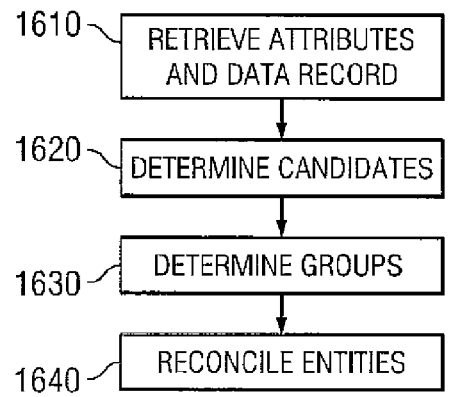
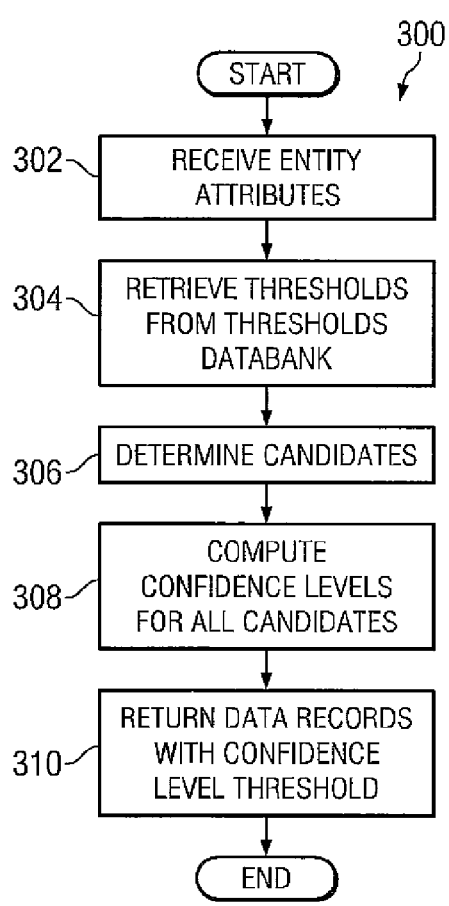
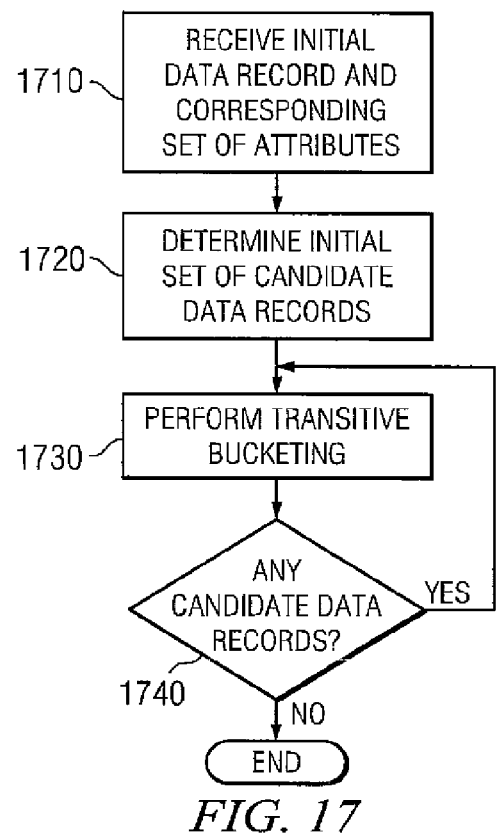

MANAGING ENTITIES WITHIN A DATABASE

CROSS-REFERENCE TO RELATED APPLICATIONS

This application claims priority from U.S. Provisional Application No. 60/920,758, filed Mar. 29, 2007, entitled "METHOD AND SYSTEM FOR MANAGING ENTITIES," which is fully incorporated by reference herein.

TECHNICAL FIELD

This disclosure relates generally to a system and method for associating data records within one or more databases, and in particular to a system and method for identifying data records in one or more databases that may contain information about the same entity and associating those data records together for easier access to information about the entity. Additionally, embodiments disclosed herein relate to associating one or more data records that may contain information about the same entity.

BACKGROUND

In today's day and age, the vast majority of businesses retain extensive amounts of data regarding various aspects of their operations, such as inventories, customers, products, etc. Data about entities, such as people, products, or parts may be stored in digital format in a computer database. These computer databases permit the data about an entity to be accessed rapidly and permit the data to be cross-referenced to other relevant pieces of data about the same entity. The databases also permit a person to query the database to find data records pertaining to a particular entity. The terms data set, data file, and data source may also refer to a database. A database, however, has several limitations which may limit the ability of a person to find the correct data about an entity within the database. The actual data within the database is only as accurate as the person who entered the data. Thus, a mistake in the entry of the data into the database may cause a person looking for data about an entity in the database to miss some relevant data about the entity because, for example, a last name of a person was misspelled. Another kind of mistake involves creating a new separate record for an entity that already has a record within the database. In a third problem, several data records may contain information about the same entity, but, for example, the names or identification numbers contained in the two data records may be different so that the database may not be able to associate the two data records to each other.

For a business that operates one or more databases containing a large number of data records, the ability to locate relevant information about a particular entity within and among the respective databases is very important, but not easily obtained. Once again, any mistake in the entry of data (including without limitation the creation of more than one data record for the same entity) at any information source may cause relevant data to be missed when the data for a particular entity is searched for in the database. In addition, in cases involving multiple information sources, each of the information sources may have slightly different data syntax or formats which may further complicate the process of finding data among the databases. An example of the need to properly identify an entity referred to in a data record and to locate all data records relating to an entity in the health care field is one in which a number of different hospitals associated with a particular health care organization may have one or more information sources containing information about their patient, and a health care organization collects the information from each of the hospitals into a master database. It is necessary to link data records from all of the information sources pertaining to the same patient to enable searching for information for a particular patient in all of the hospital records.

There are several problems which limit the ability to find all of the relevant data about an entity in such a database. Multiple data records may exist for a particular entity as a result of separate data records received from one or more information sources, which leads to a problem that can be called data fragmentation. In the case of data fragmentation, a query of the master database may not retrieve all of the relevant information about a particular entity. In addition, as described above, the query may miss some relevant information about an entity due to a typographical error made during data entry, which leads to the problem of data inaccessibility. In addition, a large database may contain data records which appear to be identical, such as a plurality of records for people with the last name of Smith and the first name of Jim. A query of the database will retrieve all of these data records and a person who made the query to the database may often choose, at random, one of the data records retrieved which may be the wrong data record. The person may not often typically attempt to determine which of the records is appropriate. This can lead to the data records for the wrong entity being retrieved even when the correct data records are available. These problems limit the ability to locate the information for a particular entity within the database.

To reduce the amount of data that must be reviewed and to prevent the wrong data record from being picked, it is also desirable to identify and associate data records from the various information sources that may contain information about the same entity. There are conventional systems that locate duplicate data records within a database and delete those duplicate data records, but these systems only locate data records which are identical to each other. Thus, these conventional systems cannot determine for instance if two data records with slightly different last names nevertheless contain information about the same entity. For much the same reason, these conventional systems cannot associate data records with multiple entities.

Moreover, in some cases, it may be desirable to associate a data record for a person with other data records for that person to represent the entity of that person while at the same time it may be desired to associated the same data record for the person with other data records for others in the same household at the person to represent a household entity. Conventional systems which may only associate identical data records together do not have this desired capability.

BRIEF SUMMARY

Embodiments disclosed herein provide a system and method for managing group entities. More specifically, in addition to associating a data record for a person with other data records for that person to represent an identity entity of that person, embodiments disclosed herein can associate the same data record for that person with other data records for other persons in a group entity. In this way, a person can be associated with members at the same household of that person.

Traditional entity management generally attempts to identify a single object. For example, if one is to query a database for "Bill Johnson", then the database might return one unique "Bill Johnson" if found or "Not Found" if none exists in the database. More advanced database management systems can create and manage identity entities more intelligently. In some cases, if a record matches any of the existing records above a certain confidence score, then that record is considered to be part of the same identity entity, even if that record matches only one other records in the identity entity.

Embodiments disclosed herein bring a class of entities together in a group entity. The definition of what makes up an identity entity is different from a group entity with which items are grouped together. An example of a group entity is a household. Following the above example, a "Bill Johnson" may live in a household at a first address and have a summer house at a second address. There may be other members in the Bill Johnson family or other people living in Bill Johnson's household. Thus, a group entity "Bill Johnson Household" may comprise members associated with Bill Johnson and living in two different addresses. However, to be included in the same group entity, every member has to match everybody else in the group entity above a certain threshold. As a specific example, to be in the group entity having A, B, and C, D would have to match A, B, and C above a predetermined threshold. By comparison, in an identity entity, if A matches B, B matches C, and C matches D, D does not have to match A or B above any threshold to be part of the same identity entity having A, B, and C.

From another perspective, an identity entity pertains to consolidating records into a single identity; whereas a group entity pertains to expressing the relationship and association among these records. Thus, with identity entities, if two guys with the same name have different date of birth, the determination that they are not the same person is a binary decision. With group entities, the grouping mechanism is not binary. A record can participate in different group entities of the same type at the same time if that record has multiple descriptions and/or attributes associated with that record that match certain required criteria. Following the above example, if a record for Bill Johnson contains multiple addresses, it may be allowed to participate in both group entities. It is thus possible for a household to be made of people traveling to the same destination at the same time. As another example, a person might be a member of a boy scout troop and also belong to a travel club. In order to keep the expression of relationship and association from exploding where everybody is linked to everybody, a group entity threshold is usually set higher than an identity entity threshold and, as mentioned before, a member has to match everybody in the group entity above that threshold. According to embodiments disclosed herein, this member can exist within multiple entities.

One advantage provided by embodiments disclosed herein pertains to the ability to resolve, store, and retrieve member data having many-to-many relationships. For example, a company may wish to utilize group entities to identify strategic relationships within or outside the company. Another example is within the intelligence community where one embodiment of a group entity management system may allow organizations to graph "persons of interest" and other associated intelligence data.

Other features and advantages of the disclosure will be better appreciated and understood when considered in conjunction with the following description and the accompanying drawings.

BRIEF DESCRIPTION OF THE SEVERAL VIEW OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings. Wherever possible, the same reference numbers will be used throughout the drawings to refer to the same or like features (elements). The drawings are not necessarily drawn to scale.

FIG. 15 is a flowchart illustrating one example of a method for finding matching data records in a database based on a set of query attributes in accordance with one embodiment of the invention.

FIG. 16 is a flow chart illustrating one embodiment of a matching/linking methodology which allows data records to be associated with multiple entities.

FIG. 17 is a flow diagram illustrating one embodiment for determining a set of candidates.

DETAILED DESCRIPTION

Figure 1:
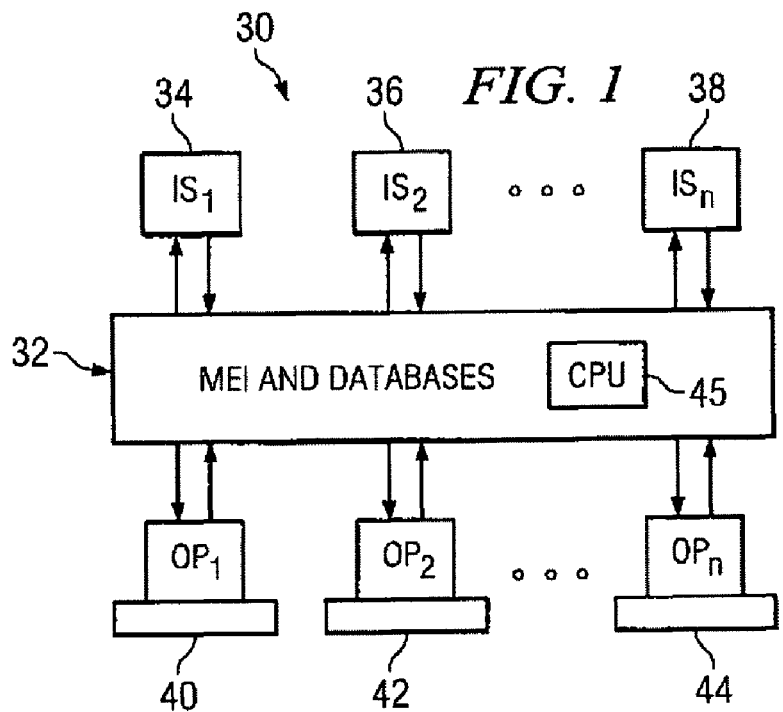
FIG. 1 is a block diagram illustrating one example of a master entity index system in accordance with one embodiment of the invention.

Preferred embodiments and the various features and advantageous details thereof are explained more fully with reference to the examples illustrated in the accompanying drawings. Descriptions of well known computer hardware and software, including programming and data processing techniques, are omitted so as not to unnecessarily obscure the invention in detail. Skilled artisans should understand, however, that the detailed description and the specific examples, while disclosing preferred embodiments of the invention, are given by way of illustration only and not by way of limitation. Various substitutions, modifications, additions or rearrangements within the scope of the underlying inventive concept(s) will become apparent to those skilled in the art after reading this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment," and the like.

Before discussing specific embodiments, an exemplary hardware architecture for implementing certain embodiments is described. Specifically, one embodiment can include a computer communicatively coupled to a network (e.g., the Internet). As is known to those skilled in the art, the computer can include a central processing unit ("CPU"), at least one read-only memory ("ROM"), at least one random access memory ("RAM"), at least one hard drive ("HD"), and one or more input/output ("I/O") device(s). Examples of I/O devices can include, but are not limited to, a keyboard, monitor, printer, electronic pointing device, mouse, trackball, stylist, or the like. In some embodiments, the computer has access to at least one database. ROM, RAM, and HD are computer memories for storing computer-executable instructions executable by the CPU. Within this disclosure, the term "computer-readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like.

The functionalities and processes described herein can be implemented in suitable computer-executable instructions. The computer-executable instructions may be stored as software code components or modules on one or more computer readable media. Examples of computer readable storage media include, but are not limited to, non-volatile memories, volatile memories, DASD arrays, magnetic tapes, floppy diskettes, hard drives, optical storage devices or any other appropriate computer-readable medium or storage device. In one exemplary embodiment of the invention, the computer-executable instructions may include lines of complied C++, Java, HTML, or any other programming or scripting code. Additionally, the functions of the present disclosure may be implemented on one computer or shared/distributed among two or more computers in or across a network. Communications between computers implementing embodiments of the invention can be accomplished using any electronic, optical, ratio frequency signals, or other suitable methods and tools of communication in compliance with known network protocols.

Reference is now made in detail to the exemplary embodiments of the invention, examples of which are illustrated in the accompanying drawings. Wherever possible, the same reference numbers will be used throughout the drawings to refer to the same or like parts (elements). In one embodiment, the system and method of the invention is particularly applicable to a system and method for indexing information from multiple information sources about companies to an explicit business hierarchy such as Dun and Bradstreet (D&B), Experian, or Equifax. It is in this context that the invention will be described. It will be appreciated, however, that the system and method in accordance with the invention has utility in a large number of applications that involve identifying, associating, and structuring into hierarchy information about entities.

In describing embodiments of the systems and methods of the present invention, it may first be helpful to go over examples of embodiments of systems and methods for associating entities which may be utilized in conjunction with embodiments of the present invention such has those described in the U.S. Pat. No. 5,991,758, entitled "System and Method for Indexing Information about Entities from Different Information Sources", issued Nov. 23, 1999 by inventor Scott Ellard hereby incorporated by reference in its entirety.

FIG. 1 is a block diagram illustrating a master entity index system 30 in accordance with one embodiment of the invention. The master entity index system may include a master entity index (MEI) 32 that processes, updates and stores data records about one or more entities from one or more information sources 34, 36, 38 and responds to commands or queries from a plurality of operators 40, 42, 44, where the operators may be either users or information systems. The MEI may operate with data records from a single information source or, as shown, data records from one or more information sources. The entities tracked using the MEI may include for example, patients in a hospital, participants in a health care system, households, parts in a warehouse or any other entity that may have data records and information contained in data records associated with it. It will be noted that multiple types of entities may be tracked and that data records from information sources 34, 36, 38 may be associated with multiple entities and multiple types of entities as will be explained in more detail below. The MEI may be a computer system with a central processing unit 45 executing a software application that performs the function of the MEI. The MEI may also be implemented using hardware circuitry.

As shown, the MEI 32 may receive data records from the information sources as well as write corrected data back into the information sources. The corrected data communicated to the information sources may include information that was correct, but has changed, information about fixing information in a data record or information about links between data records. In addition, one of the users 40-44 may transmit a query to the MEI 32 and receive a response to the query back from the MEI. The one or more information sources may be, for example, different databases that possibly have data records about the same entities. For example, in the health care field, each information source may be associated with a particular hospital in the health care organization and the health care organization may use the master entity index system to relate the data records within the plurality of hospitals so that a data record for a patient in Los Angeles may be located when that same patient is on vacation and enters a hospital in New York. As another example, in the health care field, a health care organization may use the master entity index system to relate data records within the plurality of hospitals so that data records for various patients which are members of the same household may be associated in the same entity.

The MEI 32 of the master entity index system 30 may be located at a central location and the information sources and users may be located remotely from the MEI and may be connected to the MEI by, for example, a communications link, such as the Internet. The MEI, the one or more information sources and the plurality of users may also be connected together by a communications network, such as a wide area network. The MEI may have its own database that stores the complete data records in the MEI, but the MEI may also only contain sufficient data to identify a data record (e.g., an address in a particular information source) or any portion of the data fields that comprise a complete data record so that the MEI retrieves the entire data record from the information source when needed. The MEI may link data records together containing information about the same entity in an entity identifier or associative database, as described below, separate from the actual data record. Thus, the MEI may maintain links between data records in one or more information sources, but does not necessarily maintain a single uniform data record for an entity. Now, an example of the master entity index system for a health care organization in accordance with the invention will be described.

Figure 2:
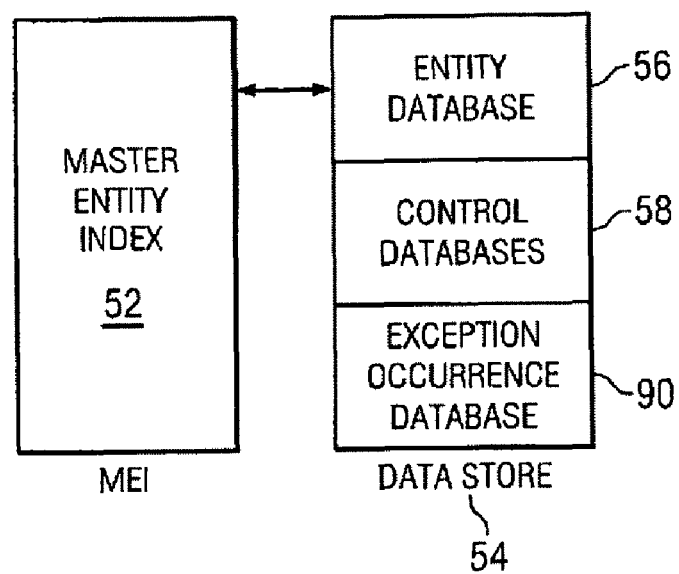
FIG. 2 is a block diagram illustrating one example of a master entity index system for a health care organization.

FIG. 2 is a block diagram illustrating an example of a master entity index system 50 for a health care organization. In this example, the master entity index system may include a master entity index 52 and a data store 54. For clarity, the one or more information sources and the multiple users are not shown, but are connected to the master entity index 52 as previously described. The data store 54 may include an entity database 56, one or more control databases 58, and an exception occurrence database 90. The entity database may store the data from the data records as specified above from the one or more information sources and may separately store links between one or more data records when those data records contain information about the same entity. The entity database may also store an address of a large data record stored in one of the information sources to reduce the storage requirements of the entity database. In this example, the information about entities within the data records may be information about patients within a plurality of hospitals which are owned by a health care organization. The MEI 52 may process the data records from the one or more information sources located at each of the hospitals, identify and associate records that contain information about the same entity, and generate the links between the separate data records when the data records contain information about the same patient.

As data records from the information sources are fed into the MEI, the MEI may attempt to match the incoming data record about an entity to a data record already located in the MEI database. The matching method will be described in more detail below. If the incoming data record matches an existing data record, a link between the incoming data record and the matching data record may be generated. If the incoming data record does not match any of the existing data records in the MEI, a new entity identifier, as described below, may be generated for the incoming data record. In both cases, the incoming data record may be stored in the MEI. Then as additional data records are received from the information sources, these data records are matched to existing data records and the MEI database of data records is increased.

The one or more control databases 58 may be used by the MEI to control the processing of the data records to increase accuracy. For example, one of the control databases may store rules which may be used to override certain anticipated erroneous conclusions that may normally be generated by the MEI. For example, the operator of the MEI may know by experience that the name of a particular patient is always misspelled in a certain way and provide a rule to force the MEI to associate data records with the known different spellings. The control databases permit the operator to customize the MEI for a particular application or a particular type of information. Thus, for a health care system containing information about a patient, the control databases may contain a rule that the nickname "Bill" is the same as the full name "William." Therefore, the MEI will determine that data records otherwise identical except for the first name of "Bill" and "William" contain information about the same entity and should be linked together. The MEI will now be described in more detail.

Figure 3:
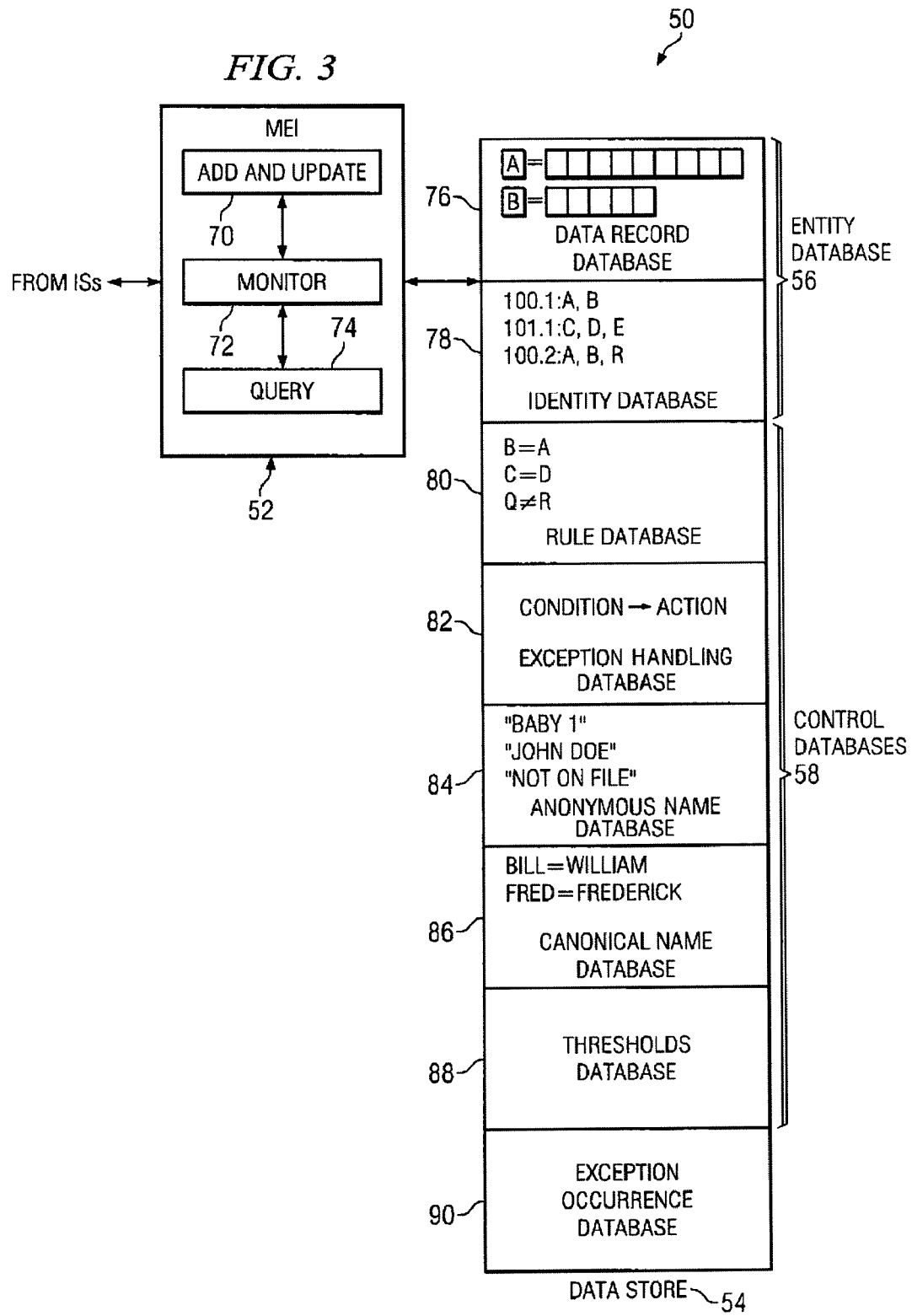
FIG. 3 is a block diagram illustrating more details of the master entity index system of FIG. 2.

FIG. 3 is a block diagram illustrating more details of the master entity index system 50, and in particular the MEI 52 and the data store 54. The MEI 52 may include an addition and updating unit 70, a monitor unit 72 and a query unit 74. The addition and updating unit may add data records about a new entity into the data store, update data records in the data store, or add new rules to the control databases. The monitor unit may permit a user of the master entity index system to view special conditions, known as exceptions, generated by the MEI. For example, a data record that requires a person to view the data record due to an error may be tagged and a message to the operator may be generated. The query unit permits a user of the master entity index system to query the MEI about information in the data records or information in the control databases of the MEI and the MEI will return a response to the query including any relevant data records or information. More details of these units and their associated functions will be described below.

For each of the operations of the MEI, including the synthesis, as described below, the querying and the monitoring, the results of those operations may depend on a trust value that may be associated with each data field in a data record. The trust computation for a data field may vary depending on the characteristics of the data field, such as the date on which that data record containing the field was received, or a quantitative characterization of a level of trust of the information source. For example, a data field containing data that was manually entered may have a lower trust value than a data field with data that was transferred directly from another information source. The trust value for a data field may also affect the probability of the matching of data records. Now, the data store 54 of the master entity index system will be described in more detail.

The MEI may provide other operations that can be constructed from combining the operations listed above For example, an operation to process data records for which it is not known if a data record exists can be constructed by combining the query operation for data records with the add new data record or update existing data record operations. These "composite" operations may lead to better performance than if the operator executed a combination of the basic operations. They also relieve the operator for having to determine the correct sequencing of operations to achieve the desired result.

The data store 54 may include an entity database 56, one or more control databases 58, and an exception occurrence database 90 as described above. The entity database may include a data record database 76 and an identity database 78. The data record database may store the data records or the addresses of the data records in the MEI, as described above, while the associative identity database may store a group of data record identifiers that associate or "link" those data records which contain information about the same entity. The separation of the physical data records from the links between the data records permits more flexibility because a duplicate copy of the data contained in the data record is not required to be present in the identity database. The data record database and the associative database may also be combined if desired.

The identity database represents the combination of data records in the data record database that refer to the same entity. Each entity is assigned an entity identifier. Entity identifiers are based on the concept of "versioned" identification. An entity identifier consists of a base part and a version number. The base part represents a specific entity about which information is being linked. The version number represents a specific combination of data records that provides information about the entity that is known at a specific time. In this example, the data records are shown as squares with the alphabetic identifier of the data record inside, and the entity identifier is shown as the base part followed by a period followed by a version number. For example, "100.1" indicates an entity identifier with 100 as the base part and 1 as the version number. In this example, entity identifier 100.1 links data records A and B, entity identifier 101.1 links data records C, D and E, and entity identifier 100.2 links data records A, B, and R. Now, the details of the control databases will be described.

The one or more control databases 58 may permit the operator of the master entity index system to customize the MEI's processing based on information known to the operator. The control databases shown are merely illustrative and the MEI may have additional control databases which further permit control of the MEI by the operator. The control databases may, for example, include a rules database 80, an exception handling database 82, an anonymous name database 84, a canonical name database 86, and a thresholds database 88.

The rules database may contain links that the operator of the system has determined are certain and should override the logic of the matching of the MEI. For example, the rules database may contain identity rules (i.e., rules which establish that a link exists between two data records) and/or non-identity rules (i.e., rules which establish that no link exists between two data records). In this example, the rules database contains identity rules which are A=B and C=D and a non-identity rule which is Q.notequal.R. These rules force the MEI to establish links between data records or prevent links from being established between data records. For example, the information sources may have four patients, with data records S, T, U, and V respectively, who are all named George Smith and the operator may enter the following nonidentity rules (i.e. S.notequal.T, T.notequal.U, U.notequal.V, V.notequal.S) to keep the data records of the four different entities separate and unlinked by the MEI. The rules in the rules database may be updated, added or deleted by the operator of the master entity index system as needed.

The exception handling database 82 contains one or more exception handling routines that permit the master entity index system to handle data record problems. The exception handling rules within the database may have the form of "condition.fwdarw.action" processing rules. The actions of these rules may be actions that the MEI should automatically take in response to a condition, for example, to request that an individual manually review a data record. An example of an exception handling rule may be, "if duplicate data record.fwdarrow.delete data record" which instructs the MEI to delete a duplicate data record. Another example is, "if different attributes (sex).forwardarrrow.request further review of data record" which instructs the MEI that if there are two data records that appear to relate to the same entity, but the sex of the entity is different for each data record, the MEI should request further review of the data records. In response to this request, an operator may determine that the data records are the same, with an incorrectly typed sex for one of the records and the operator may enter a rule into the rules database that the two data records are linked together despite the difference in the sex attribute. The exception database may have an associated database 90 (described below) which stores the actual exceptions that occur during processing of the input data records.

The anonymous name database 84 permits the MEI to automatically recognize names that should be ignored for purposes of attempting to match two data records. In this example, the anonymous name database may contain "not on file", "John Doe" and "baby 1" which are names that may be typically assigned by a hospital to a patient when the hospital has not yet determined the name of the patient. As another example, a part not in a warehouse inventory may be referred to as "not on file" until the part may be entered into the database. These anonymous names may be used by the MEI to detect any of the anonymous names or other "filler" data that hold a space, but have no particular meaning in data records and ignore those names when any matching is conducted because a plurality of data records containing the name of "John Doe" should not be linked together simply because they have the same name.

The canonical name database 86 may permit the MEI to associate short-cut data, such as a nickname, with the full data represented by the short-cut data, such as a person's proper name. In this example for a health care organization, the nickname Bill may be associated with William and Fred may be associated with Frederick. This database permits the MEI to link together two data records that are identical except that one data record uses the first name Bill while the second data record uses the first name William. Without this canonical name database, the MEI may not link these two data records together and some of the information about that patient will be lost. The thresholds database 88 permits the thresholds used by the MEI for matching data records, as described below, to be adjustable. For example, an operator may set a high threshold so that only exact data records are matched to each other. A lower threshold may be set so that a data record with fewer matching data fields may be returned to the user in response to a query. The details of the matching method will be described below in more detail.

The exception occurrence database 90 allows the MEI to maintain a record of all of the exceptions that have occurred. The exception occurrence database 90 may store the actual exception conditions that have arisen during processing. For example, the exception occurrence database 90 may contain an entry that represents that entity 100.2 has two data records with different values for the "sex" attribute.

The operator of the MEI may clear the identity database 78 without clearing the data record database 80. Thus, an operator may have the MEI receive a plurality of input data records and generate a plurality of links with a particular matching threshold level, as described below, being used. The operator may then decide to perform a second run through the data using a lower matching threshold level to produce more links, but does not want to delete the data records themselves, and does not want to delete the identity and non-identity rules from the rules database created during the first run through the data. Thus, the operator may delete the identity database, but keep the control databases, and in particular the rules database, for the second run through the data. Now, a method of adding or updating data in the master entity index in accordance with the invention will be described.

Figure 4:
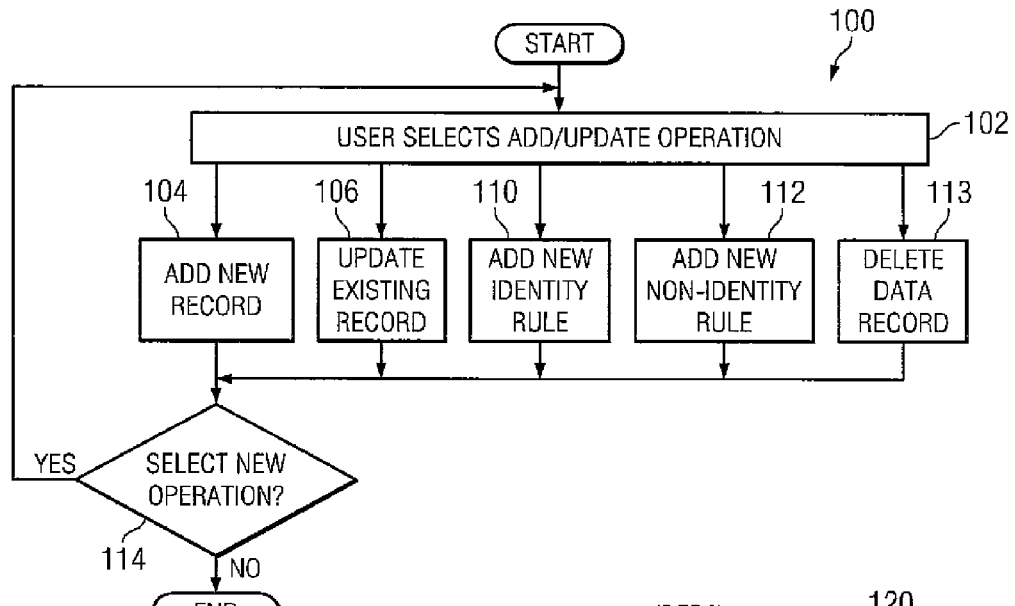
FIG. 4 is a flowchart illustrating one example of a method for adding or updating data within one embodiment of a master entity index system.

FIG. 4 is a flowchart illustrating a method 100 for adding or updating data within the master entity index system. The user selects an add/update operation in step 102 which permits the user to select, for example, an add new data record operation 104, an update an existing data record operation 106, an add new identity rule 110, an add new non-identity rule 112, and a delete data record operation 113. The add new data record operation permits a user of the MEI to add a new data record containing information about an entity into the MEI while the update an existing data record operation permits a user of the system to update the data record or information about an entity that already exists within the MEI. The add identity and add non-identity rule operations permit the user to add identity or nonidentity rules into the rules database 80 shown in FIG. 3. The delete operation permits the user of the MEI to delete a data record from the data records database. Each of these operations will be described in more detail below with reference to FIGS. 7-12. The MEI may then determine whether there are additional addition or updating operations to perform in step 114 based on the user's response and either exit the method or return to step 102 so that the user may select another addition or updating operation. The add/update/delete operation may also be used for the control databases to add/update information in those databases, and additional processing may occur due to changes in the control databases which may change the identity database. In all of those cases, the additional processing is to identify the existing identity records that are impacted by the modification, and to use the match/link operation to re-compute the appropriate entries in the identity database. For example, removing a record for the anonymous name database would cause re-computation of identities of all records with that anonymous name, and all records linked to those records.

For all of the data records stored by the MEI, a record identifier may be used to uniquely identify the entity referred to by that record compared to other data records received from the data source. For example, in data records obtained from a hospital information system, an internally-generated patient identifier may be used as a record identifier, while in data records from a health plan membership database, a social security number can be used as a record identifier. A record identifier differs from an entity identifier because its scope is only the data records from a single data source. For example, if a person in a health plan is also a patient in a particular hospital, then his or her hospital record will have a different record identifier than his or her health plan record. Furthermore, if records from those two data sources happened to have the same record identifier, this would be no indication that the records referred to the same entity.

An additional aspect of the data record database is that one or more timestamps may be recorded along with the data record. The timestamps may indicate when the data record was last changed, indicating when the data record is valid, and when the data record was received from the information source. The timestamps may be used to track changes in a data record which may indicate problems, such as fraud, to the operation of the MEI. The timestamps may be generated whenever a data record is added to the MEI or updated so that the historical changes in the data record may be documented. Additionally, individual attribute values may be associated with status descriptors that describe how the values should be used. For example, an attribute value with an "active" status would be used for identification, an attribute value with an "active/incorrect" status would be used for identification but not presented to the operator as being the correct value (for example, an old address that still occurs in some incoming data records), and a status of inactive/incorrect means that the value should no longer be used for matching but should be maintained to facilitate manual review. Now, a method for querying the MEI in accordance with the invention will be described.

Figure 5:
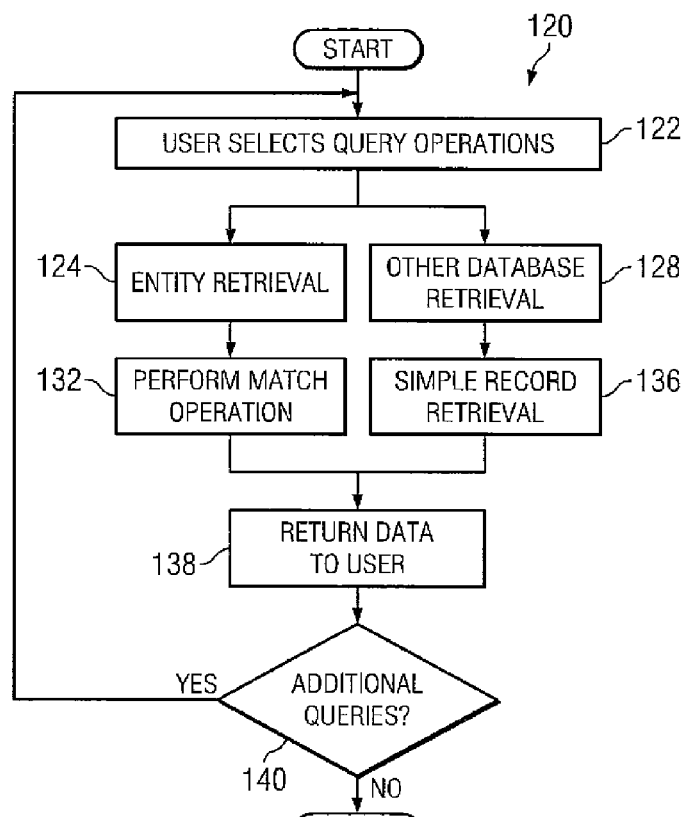
FIG. 5 is a flowchart illustrating one example of a method for querying one embodiment of a master entity index system.

FIG. 5 is a flowchart illustrating a method 120 for querying the master entity index in accordance with one embodiment of the invention. The querying operations permit a user to retrieve information from the MEI about a particular entity or data from one of the control databases. After a user selects the query operation in step 122, the user may select from a particular query operation that may include an entity retrieval operation 124, or a database query operation 128. For the entity retrieval operation, the MEI in step 132 may execute the match operation 300 described below. During the match operation, an input query may be matched against data records within the various information sources, as described in more detail below with reference to FIG. 15. For the database retrieval operation, the operator specifies a database and a set of attribute values that indicates the records of interest. The MEI in step 136 may locate those records in the specified database that has corresponding values for the specified attributes.

Additional queries may be performed by the MEI. The MEI may be queried about the number of entities in the MEI database and the MEI may respond with the number of entities in the MEI database. The MEI may also be queried about the volatility (e.g., the frequency that the data records change) of the data in the data records using a timestamp indicating the last time and number of times that the data has been changed that may be associated with each data record in the MEI. The volatility of the data may indicate fraud if the data about a particular entity is changing frequently. The MEI may also be queried about the past history of changes of the data in the data records so that, for example, the past addresses for a particular entity may be displayed. Once the queries or matches have been completed, the data is returned to the user in step 138. The MEI may then determine whether there are additional queries to be performed in step 140 and return to step 122 if additional queries are going to be conducted. If there are no additional queries, the method ends. Now, an exception processing method that may be executed by the MEI will be described.

Figure 6:
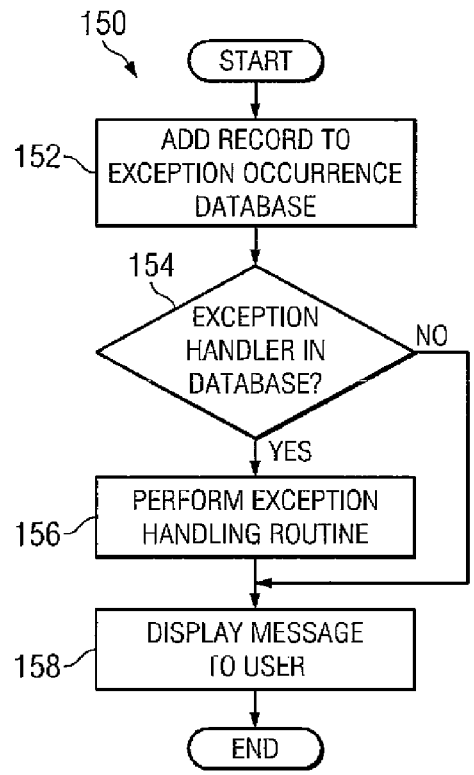
FIG. 6 is a flowchart illustrating one example of a method for processing exceptions that may be executed by one embodiment of a master entity index system.

FIG. 6 is a flowchart of a method for processing exceptions 150 that may be executed by the MEI. The input is data describing the occurrence of an exception, for example, an entity whose data records indicate two different values for the entity's sex. In step 152, the exception given as input to the operation is recorded in the exception occurrence database 90. In step 154, the MEI determines if there is an exception handling rule within the exception handling database 82 for handling the anomaly, as shown in FIG. 3 As described above, the exception handling database contains a plurality of rules for handling various types of exceptions. If an exception handling rule is in the exception handling database, in step 156, the MEI may perform the exception handling routine in the database. The routine may generate a message for the operator or may process the data using another software program. A message may be displayed to the user in step 158. If there was not an exception handling routine in the exception handling database, then a message is printed for the user in step 158. The message may require the user to perform some action or may just notify the operator of the action being taken by the MEI in response to an exception. After the message is displayed, the exception handling method has been completed. Now, the operations that may be performed by the MEI during the addition and updating data method will be described.

Figure 7:
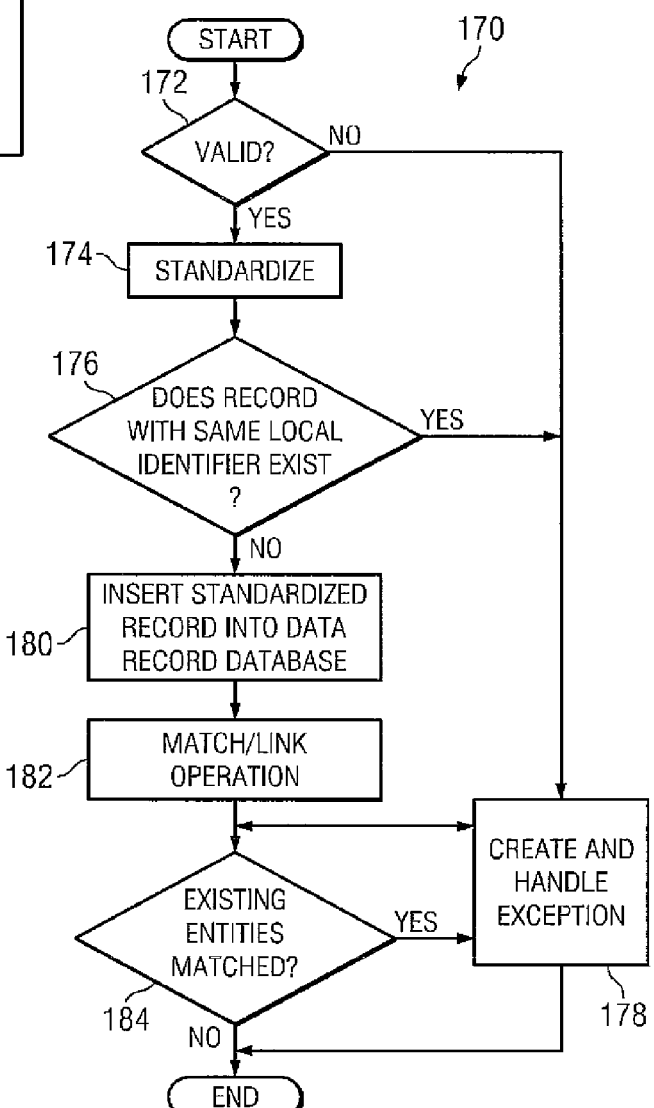
FIG. 7 is a flowchart illustrating one example of a method for inserting a new data record into one embodiment of a master entity index system.

FIG. 7 is a flowchart illustrating a method 170 for inserting a new data record into the MEI in accordance with one embodiment of the invention. The insertion of a new data record for a new entity usually occurs when a particular information source has determined that the new data record should not refer to the same entity as any other data record previously generated by the information source. For inserting a new data record into the MEI, a record containing the new data is received by the MEI from the user. The MEI may then attempt to validate and standardize the fields in the new data record.

Validation in step 172 may include examining the lengths of the fields or the syntax or character format of the fields, for example, as numeric fields may be required to contain digits in specified formats. Validation may also involve validating codes in the new data record, for example, valid state abbreviations or diagnostic codes. Additional data sets may be involved in the validation process, for example, a data set containing valid customer account numbers. If the validation process fails, in step 178 an exception may be created that indicates that invalid data is received, the exception handling method described above may be performed, and processing of the insert new record operation is complete.

During standardization in step 174, the MEI may process the incoming data record to compute standard representations of certain data items. For example, the incoming data record may contain the first name of "Bill" and the MEI may add a matching field containing "William" into the incoming data record so that the MEI may match data records to William. This standardization prevents the MEI from missing data records due to, for example, nicknames of people. Other kinds of standardization may involve different coding systems for medical procedures or standard representation of street addresses and other geographic locations.

The MEI may then attempt in step 176 to determine if a data record with the same record identifier already exists in the data record database. If the standardized input data has the same record identifier as an existing data record, in step 178 an exception may be created that indicates that two data records with the same record identifier have been received, the exception handling method described above may be performed, and processing of the insert new record operation is complete. If the standardized input data does not have the same record identifier as an existing data record, then the standardized input data may be added into the MEI and a timestamp may be added to the data record in step 180. Then in step 182, the match/link method 210 described below and summarized in FIG. 15 may be performed. The match/link operation is initiated using the standardized input data, and its execution makes the results of the match/link operation available to the insert new data record operation. Then in step 184, the MEI may determine if the match/link operation linked the standardized input data record with any other records from the same information source. If so, in step 178 an exception may be created that indicates that a duplicate data record has been received, the exception handling method described above may be performed, and processing of the insert new record operation is complete. If not, the results of the match/link operation are returned to the operator and the insert new data record operation has been completed. Now, a method for updating an existing data record already in the MEI will be described.

Figure 8:
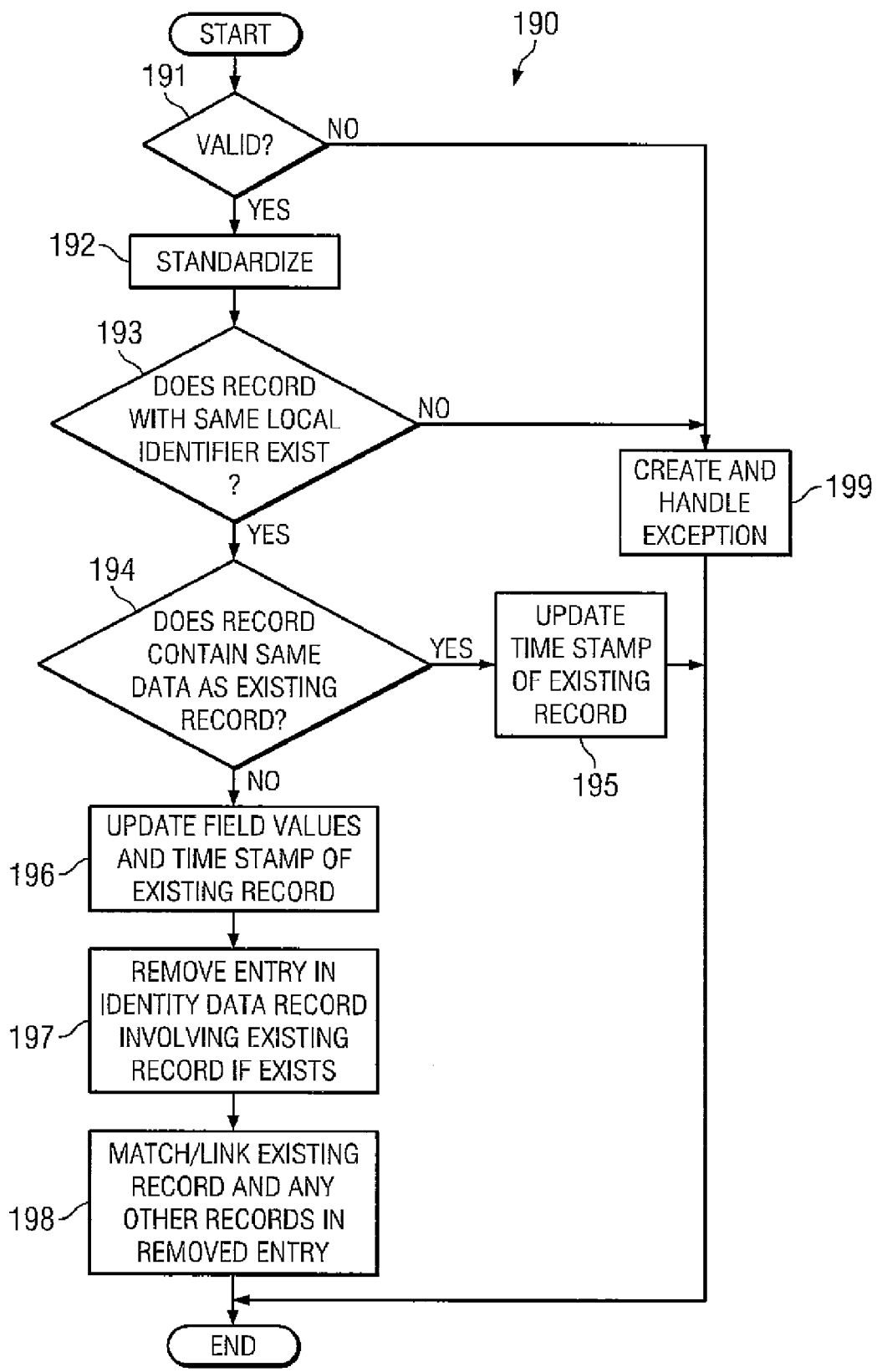
FIG. 8 is a flowchart illustrating one example of a method for updating an existing data record containing information about a new or existing entity in accordance with one embodiment of the invention.

FIG. 8 is a flowchart illustrating a method 190 for updating an existing data record containing information about a new or existing entity in accordance with one embodiment of the invention. Updates occur when an information source receives new information concerning an entity for which is already in its data store. The new information received by the information source will be communicated to the MEI through the update operation. To perform the update method, the MEI may first test the input data for validity in step 191, using the same method as in step 172 of the add new record operation described in FIG. 7. If the validation process fails, in step 199 an exception may be created that indicates that invalid data is received, the exception handling method described above may be performed, and the processing of the update existing data record operation is complete. The MEI may then standardize the input data in step 192, using the same method as in step 174 of the add new record operation. The MEI may then attempt in step 193 to determine if a data record with the same record identifier as the standardized input data already exists in the data record database. If the standardized input data does not have the same record identifier as an existing data record, a new item may be added to the exception database in step 199 indicating that a duplicate data record was located, and no further processing is performed.

If the standardized input data does have the same record identifier as an existing data record, then the incoming data record is checked in step 194 to see if it contains exactly the same values for data fields as a data record already contained in the data record database. If the standardized input data does not have the same record identifier as an existing data record, in step 199 an exception may be created that indicates that a duplicate data record has been received, the exception handling method described above may be performed, and processing of the update existing data record operation is complete. If the standardized input data contains exactly the same values, then the execution of this operation cannot affect the identity database. As a result, the timestamp of the existing data record may be updated in step 195 to reflect the current time and processing of the operation is completed. If the standardized input data contains different field values than the existing record with the same record identifier, in step 196 the existing record's field values may be updated to be consistent with the values in the standardized input data, and its timestamp may be updated to reflect the current time. Since the data in the existing record has now changed, the impact on the identity database must be computed. To do this, the MEI in step 197 may first remove an entry in the identity database involving the existing record, if such an entry exists. The MEI may then perform a match/link operation in step 198 for the existing records and any other records referred to in the identity database record removed in step 197. These are the records that had been previously recorded in the identity database as referring to the same entity as the existing data record. The match/link operation performs as described in FIG. 9. Once the match/link results have been returned in step 198 or the timestamp updated in step 195 or an exception has been generated in step 199, the update record operation has been completed. Now, a method for matching/linking a data record will be described.

Figure 9:
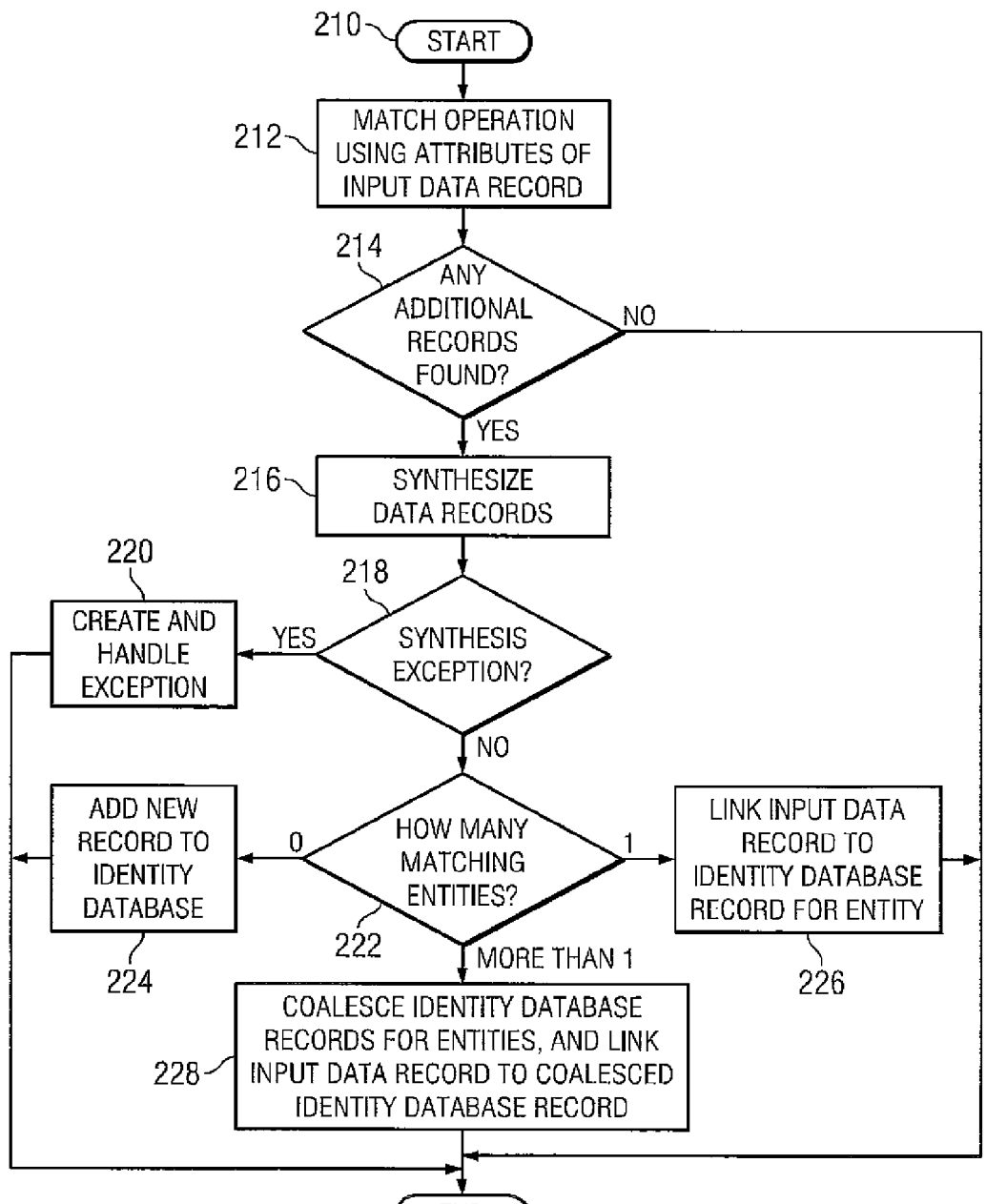
FIG. 9 is a flowchart illustrating one example of a method for matching/linking a data record in accordance with one embodiment of the invention.

FIG. 9 is a flowchart illustrating a method 210 for matching/linking a data record in accordance with one embodiment of the invention. This operation is used to determine the data records in the data record database that refer to the same entity as an input data record in the data record database.

To perform the match/link operation, in step 212, the MEI may perform the match operation 300 described below and diagrammed in FIG. 15. In this step, the data in the input data record is given to the match operation as its input, and the data records returned by the match operation are made available. The MEI may then in step 214 determine if any matching data records were made available. If no data records other than the input data record were returned, the match/link operation is completed. If at least one, other data record was returned, the incoming data record and matching data records may be synthesized in step 216. The synthesis process combines the data values in the new record and the existing records associated with the entities. The MEI may then in step 218 determine if a condition indicating a synthesis exception has occurred, as defined by the current contents of the exception database. For example, if the incoming data record lists the sex of the entity as male while one of the matching data records lists the sex of the entity as female, and the exception database states that coalescing records with different sexes is an exceptional condition, an exceptional condition will be identified. If an exception occurs, in step 220 the MEI may create and handle the appropriate synthesis exception and the processing of the match/link operation is complete. If there are no synthesis exceptions, then in step 222, the MEI may determine the number of identity records currently held in the identity database that link data records which match the input data record. If no identity records exist, in step 224, a record may be added to the identity database with a new unique base part and a version number of 0. If exactly one identity record exists, in step 226 the MEI may update this record to add a link to the input data record. If more than one identity record exists, the MEI in step 228 may "coalesce" these records—that is, remove the existing identity records and replaces them with a single identity record linking the input data records with all the data records returned in step 212. After one of steps 224, 226, and 228 are performed, the processing of the match/link operation has been completed. Now, a method for adding an identity rule in accordance with the invention will be described.

Figure 10:
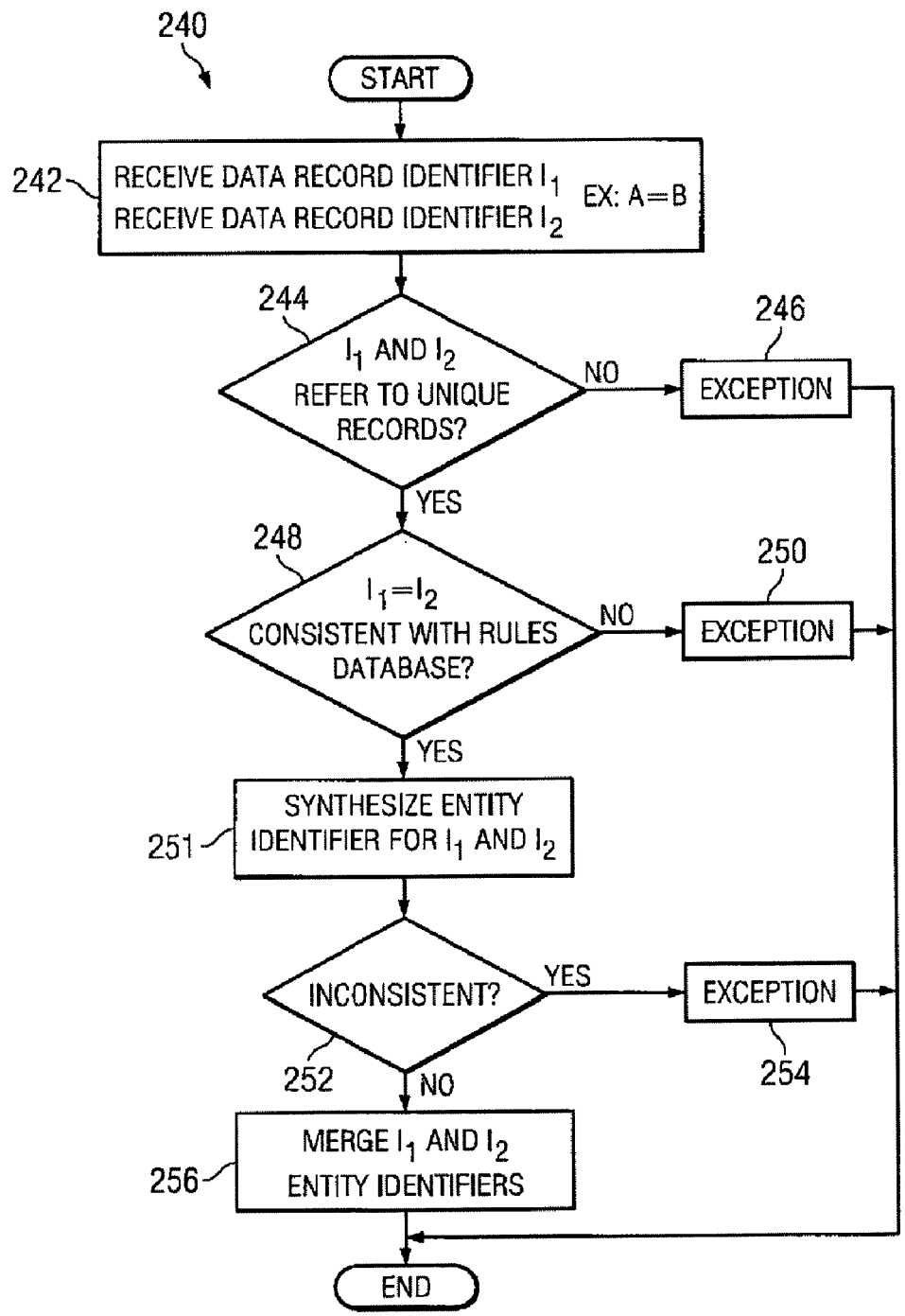
FIG. 10 is a flowchart illustrating one example of a method for adding an identity rule to the rules database of one embodiment of a master entity index system.

FIG. 10 is a flowchart illustrating a method 240 for adding an identity rule to the rules database of the MEI in accordance with one embodiment of the invention. In step 242, the MEI may receive two data record identifiers, $l_1$ and $l_2$. In this example, the identity rule is $I_1 = I_2$ which means that these two data records contain information about the same entity. The MEI may then determine if the two identifiers refer to separate unique records in step 244 and an exception routine may be executed in step 246 if an exception occurs. If there is no exception, the MEI determines if the new identity rule is consistent with the rules already contained in the rules database in step 248. If there is an exception, such as the rules database has a non-identity rule that specifies that $I_1$ and $I_2$ are not associated with each other, an exception routine is executed in step 250. If the new identity rule is consistent with the other rules in the rules database, then the entity identifier containing the two data records are synthesized in step 251 to determine if there are any inconsistencies within the associations of the two entity identifier as shown in step 252. If there are any inconsistencies in the entity identifier, an exception handling routine is executed in step 254. Otherwise, the entity identifier containing the two data records are merged together in step 256 and the method is completed. Now, a method of adding a non-identity rule to the rules database in accordance with the invention will be described.

Figure 11:
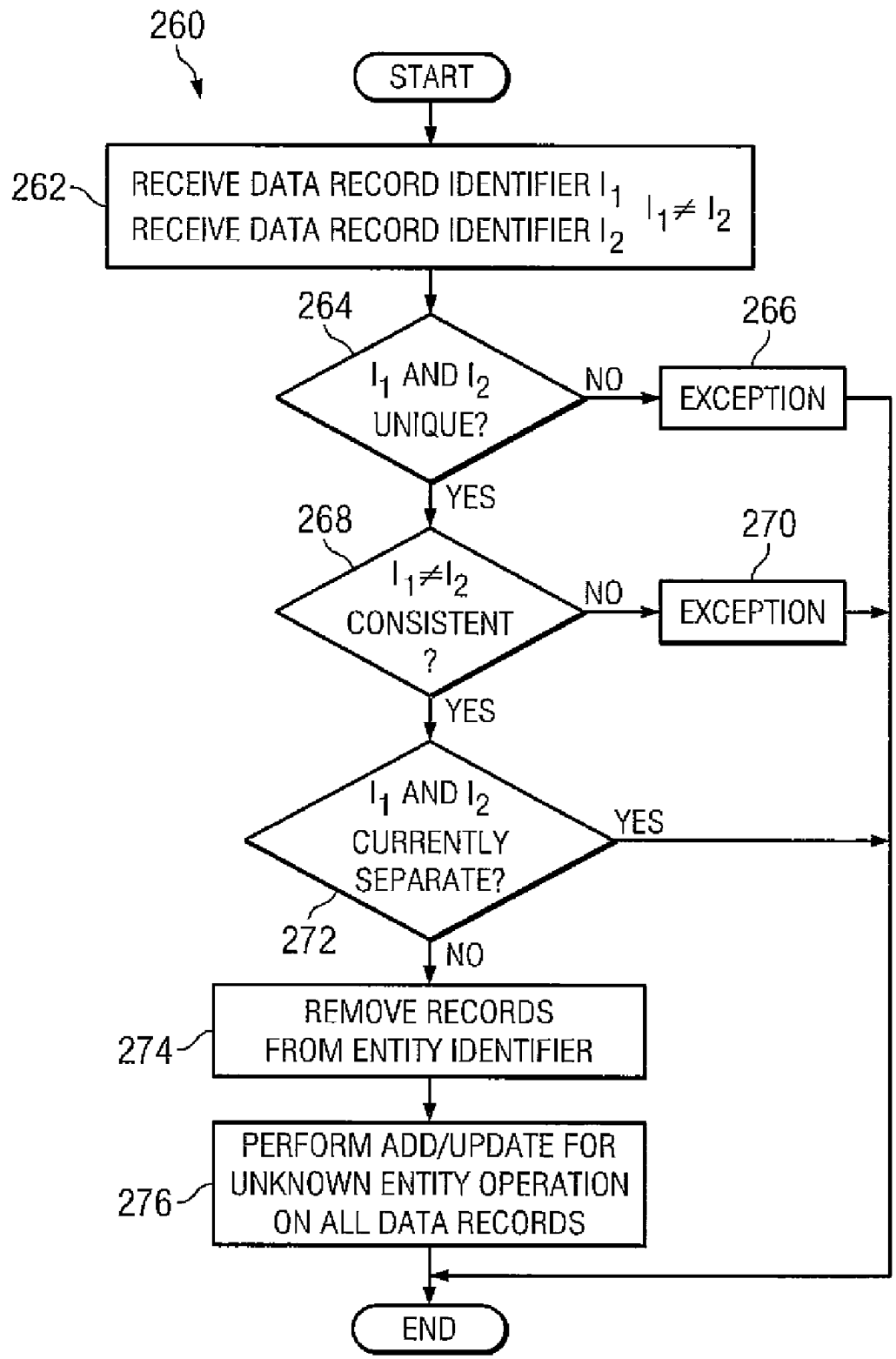
FIG. 11 is a flowchart illustrating one example of a method for adding a non-identity rule to the rules database of one embodiment of a master entity index system.

FIG. 11 is a flowchart illustrating a method 260 for adding a non-identity rule to the rules database of the MEI in accordance with one embodiment of the invention. In step 262, the MEI may receive two data record identifiers, $I_1$ and $I_2$. In this example, the non-identity rule is $I_1 \neq I_2$ which means that these two data records contain information that is not about the same entity. The MEI may then determine if the two identifiers refer to separate unique records in step 264 and an exception routine may be executed in step 266 if an exception occurs. If there is no exception, the MEI determines if the new non-identity rule is consistent with the rules already contained in the rules database in step 268. If the new non-identity rule conflicts with one of the existing rules in the rules database, an exception occurs in step 270. If the new non-identify rule does not conflict, then the MEI determines whether the two data records corresponding to the identifiers are currently located in different entity identifier in step 272. If the data records are already separated, then the method ends. If the data records are not currently in different entity identifiers, then in step 274 the data records identified by $I_1$ and $I_2$ as well as the other data records are removed from the entity identifier containing the data records identified by $I_1$ and $I_2$. Then, in step 276, the match/link operation, as described above, is performed on each data record removed from the entity identifier. The match/link operation may re-associate those data records previously in the entity identifier with other data records or reestablish the entity identifier without either $I_1$ or $I_2$. Now, a method for deleting data records in accordance with the invention will be described.

Figure 12:
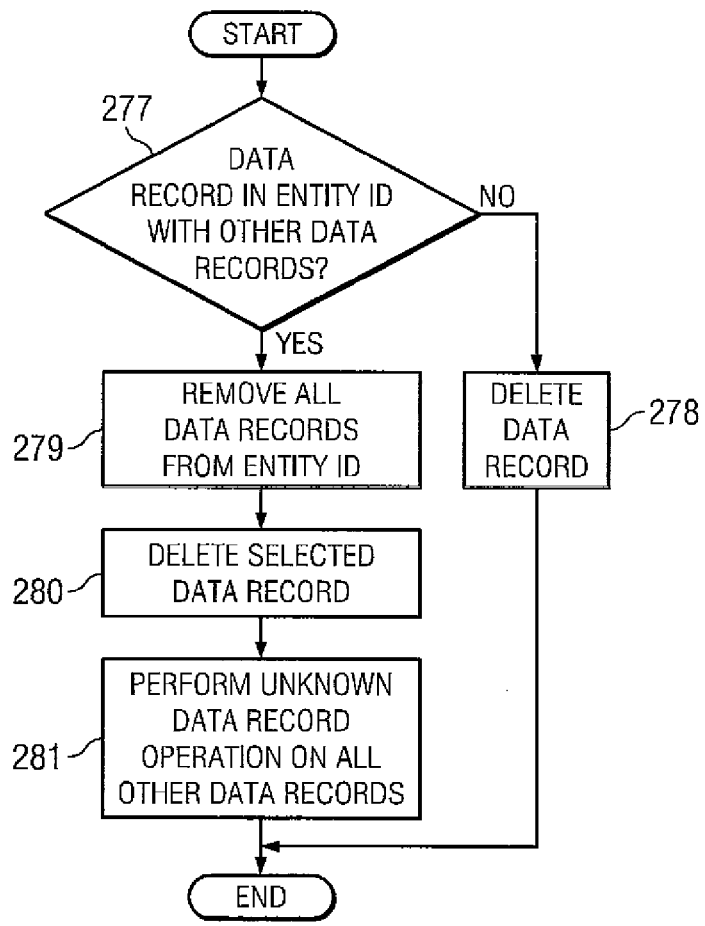
FIG. 12 is a flowchart illustrating one example of a method for deleting a data record in accordance with one embodiment of the invention.

FIG. 12 is a flowchart illustrating a method for deleting a data record in accordance with one embodiment of the invention. In step 277, the MEI determines if the data record to be deleted is located within an entity identifier with other data records. If there are no other data records in the entity identifier, then in step 278, the data record may be deleted and the method is completed. If there are other data records associated with the data record to be deleted, then in step 279, all of the data records are removed from the entity identifier, and in step 280, the selected data record may be deleted. Then in step 281, a match/link operation, as described above, is executed for the other data records previously in the entity identifier. The match/link operation may re-associate those data records previously in the entity identifier with other data records or reestablish the entity identifier without the deleted data records. Now, a method for querying the MEI for data records and querying the MEI for information from the other control databases will be described.

Figure 13:
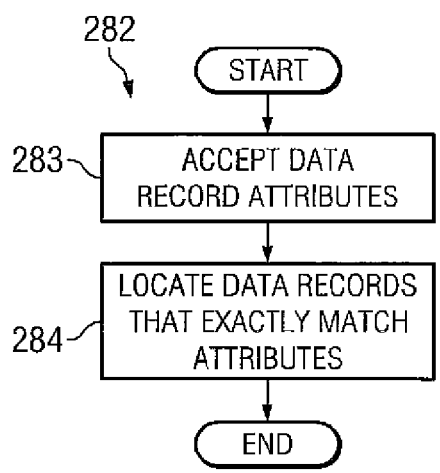
FIG. 13 is a flowchart illustrating one example of a method for querying one embodiment of a master entity index system for data records about a particular entity.

FIG. 13 is a flowchart illustrating a method 282 for querying the MEI system for data records about a particular entity according to one embodiment of the invention. In step 283, the MEI accepts a query from the user that contains entity attributes. These attributes correspond to data fields within the data records stored by the MEI. In step 284, the MEI retrieves data records which have data fields that match the attributes provided in the query and displays those located data records for the user. The details of the matching method will be described below in method 300 and illustrated in FIG. 15.

Figure 14:
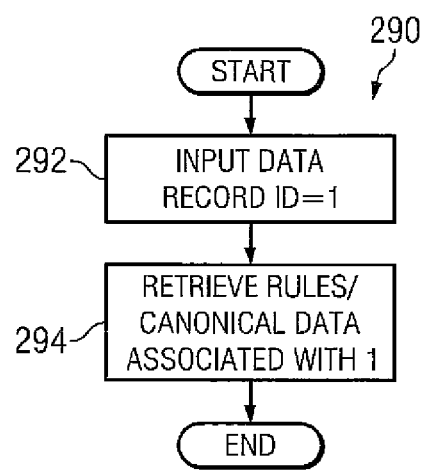
FIG. 14 is a flowchart illustrating one example of a method for querying one embodiment of a master entity index system to locate information in the databases thereof.

FIG. 14 is a flowchart illustrating a method 290 for querying the MEI to locate information in the databases of the MEI. In step 292, the operator may input a database and values for fields maintained in records of the database. In step 294, the MEI may retrieve any information from the control databases relating to the data record identifier I. For example, if the user queries the MEI about rules in the rules database containing identifier I, the MEI may return the identity rule I=M and the non-identity rule I.notequal.N. Now, a method for computing the match operation data records in the MEI database based on a set of query attributes will now be described.

FIG. 15 is a flowchart illustrating a method 300 for finding matching data records in the MEI database based on a set of query attributes in accordance with one embodiment of the invention. In step 302, the MEI accepts a query in the form of a list of entity attributes and associated values. Examples of entity attributes in a health care example could be patient number, first name, last name, or phone number, or if the database is a parts inventory, the part number, or the manufacturer for the part. In step 304, the threshold being used by the matching operation may be retrieved from the thresholds database shown in FIG. 3. As described above, the thresholds database permits different threshold levels to be used depending on how close a match is desired by the operator.

Once the threshold has been set, in step 306, a plurality of candidates may be retrieved. To select the candidates, the input attributes are divided into combinations of attributes, such as the last name and phone number of the patient, the first name and last name of a patient, and the first name and phone number of the patient. The data records in the MEI database are exactly matched against each combination of attributes to generate a plurality of candidate data records. Determining candidates from several combinations of attributes permits more fault tolerance because a data record may have a misspelled last name, but will still be a candidate because the combination of the first name and the phone number will locate the data record. Thus, a misspelling of one attribute will not prevent the data record from being a candidate. Once the group of candidates has been determined, the confidence level for each candidate data record may be calculated at step 308.

The confidence level may be calculated based on a scoring routine, which may use historical data about a particular attribute, such as a last address. Thus, if the current address and past addresses match a query, the confidence level is higher than that for a data record with the same current address but a different old address. The scoring routine may also give a higher confidence level to information more likely to indicate the same entity, such as a social security number. The scoring routine may add the confidence level for each attribute to generate a confidence level value for a candidate record (match score). Once the confidence levels have been calculated, any data records with confidence levels higher than the threshold level are displayed for the user in step 310. The method of matching attributes to data records within the MEI database has been completed.

As mentioned above, in some cases, it may be desirable to allow data records in MEI to be associated with multiple entities. Examples of such entities may include, but are not limited to, individuals, households, shipping containers, organizations, etc. To facilitate the ability to include data records in multiple distinct entities, particular matching or linking methodologies may be utilized in accordance with the methods and systems of the present invention. Embodiments of these operations may be used to determine data records that refer to the same entity as an input data record and allow these data records to belong to multiple entities.

FIG. 16 is a flow chart illustrating one embodiment of a matching/linking methodology which allows data records to be associated with multiple entities. A data record and a set of attributes, including values thereof, associated with the data record may be received at step 1610. At step 1620, a set of candidates may be determined based on the set of attributes associated with the received data record. Step 1620 is described in detail below with reference to FIG. 17. One or more groups may then be determined using the set of candidates and the data record at step 1630 and entities may be reconciled based on these groups at step 1640.

FIG. 17 is a flow diagram illustrating one embodiment for determining a set of candidates. At step 1710, the set of attributes associated with an initial data record may be received or otherwise determined. Examples of attributes in a health care example could be patient number, first name, last name, or phone number, or if the database is a parts inventory, the part number, the manufacturer for the part, etc. Using at least one of this set of attributes, a set of candidate data records corresponding to the initial data record may be determined at step 1720. These candidate data records may be selected by comparing values for one or more attributes or combinations of attributes between data records in the MEI database and the values for the set of attributes of the initial data record. Following the health care example above, such candidate data records may be selected by comparing the last name and phone number of the patient, the first name and last name of the patient, the first name and phone number of the patient etc. In one embodiment, a data record in the MEI database may be selected as a candidate data record if the value for one attribute of the data record exactly matches the value for the corresponding attribute of the initial data record.

Figure 18:
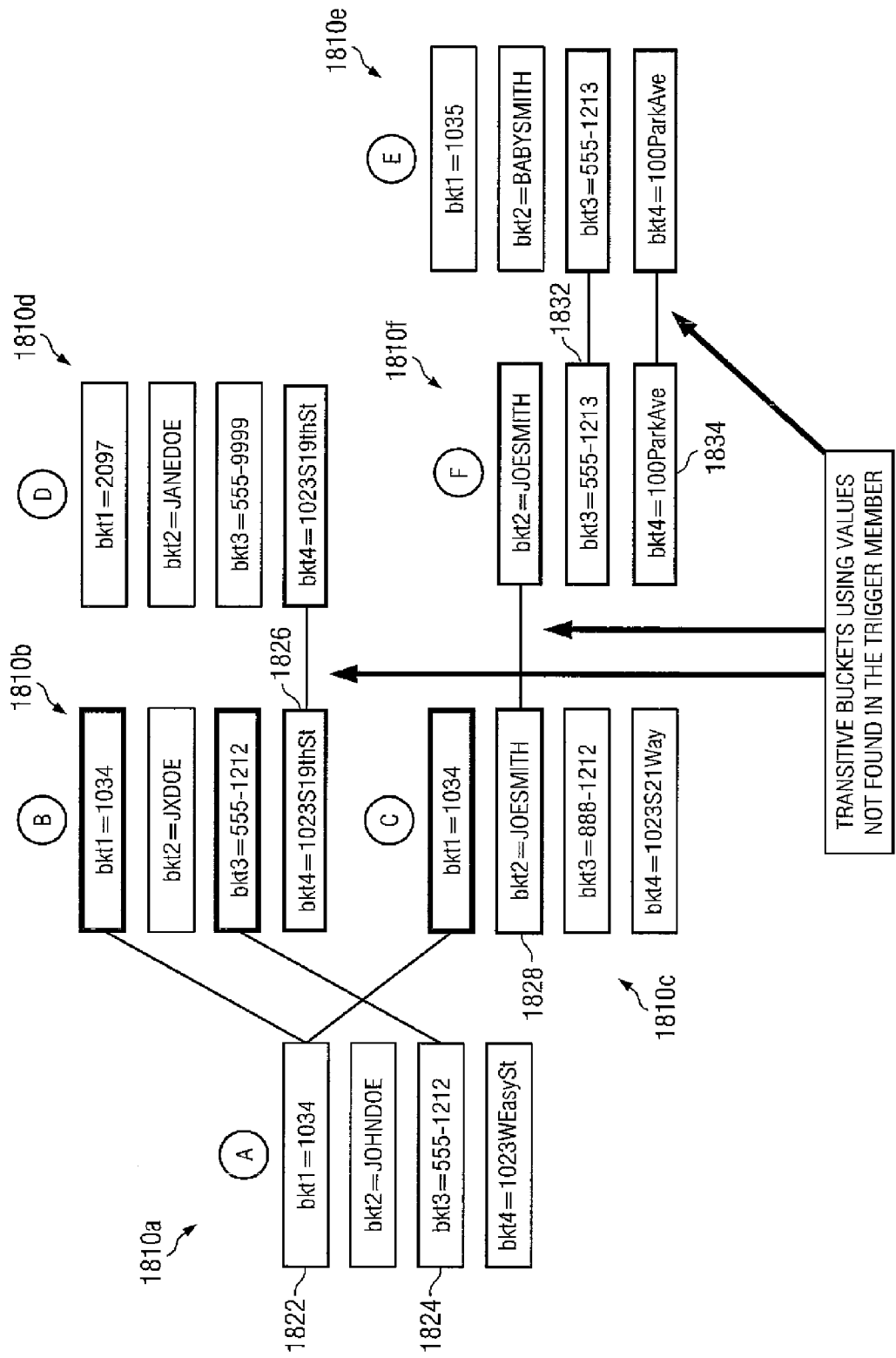
FIG. 18 depicts one example of a system and method of group entity management which allows data records to belong to more than one entity.
Figure 19:
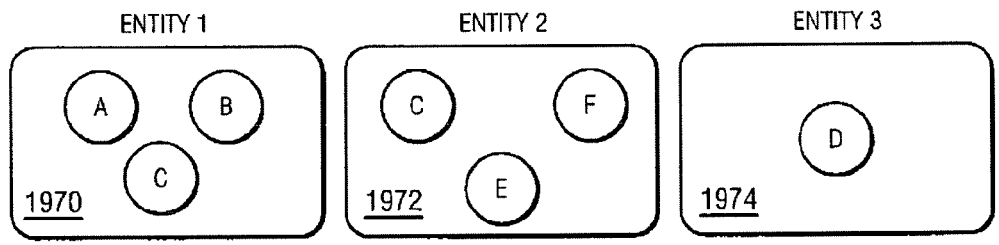
FIG. 19 is a block diagram illustrating examples of group entities created after the transitive bucketing process of FIG. 18.

At step 1730, a process called transitive bucketing may be performed. For the purpose of illustration, transitive bucketing is akin to putting items in a common bucket if there is a definable logical relationship between these items. Note these items may themselves belong to different buckets. For example, suppose a given relation exists between "a" and "b" and between "b" and "c", then it also exists between "a" and "c". Transitive relationships may include "is greater than," "is equal to," and "is similar to." In the example of FIG. 17, for each of the candidate data records determined at step 1720 to be corresponding to the initial data record, an additional set of candidate data records may be determined using transitive bucketing. More specifically, in one embodiment, these additional candidate data records may be determined using attributes which were not used at step 1720 to determine the set of candidate data records corresponding to the initial data records. This process may be repeated—by using each of the additional candidate data records thus returned to determine even more corresponding candidate data records—until no more candidate data records are returned at step 1740. Again, in one embodiment, a determination of a set of candidate records from a particular candidate data record may be determined using attributes which were not used to determine the particular candidate data record. FIG. 18 and FIG. 19 below illustrate example embodiments of this process in detail.

Referring back to FIG. 16, the initial data record and the candidate data records may then be grouped and entities reconciled based on these groups at steps 1630 and 1640. More specifically, at step 1630, an initial data record and a set of candidate data records may be received or otherwise determined or obtained (as discussed above). Each of the initial data record and the set of candidate data records may be compared to one another to generate an associated score, indicating a confidence level or likelihood to match, between each of the data records (i.e., the initial data record and the set of candidate data records). The data records are then grouped using these scores. In one embodiment, for each of the data records that does not match any other data records above the threshold, a group comprising that data record is created. In one embodiment, such a group entity is called a singleton. The remainder of the groups are created by forming groups where every data record which matches another data record above the threshold score is grouped with that data record, all data records in a group match one another above the threshold score and no two groups exist where every member of one group matches every member of the other group above the threshold score.

Entities may then be reconciled at step 1640 using the set of groups. In one embodiment, for each of the groups, it may be determined whether a corresponding entity exists in the data store of MEI. In this case, a corresponding entity may be an entity which comprises at least one of the data records of the group and no data records which are not in the group. If no corresponding entity is found in the data store, an entity corresponding to the group may be created and associated with the data record(s) of the group (e.g. an entity identifier created and the data record(s) of the group associated with the entity identifier). If a corresponding entity is found, and data records of the group which are not associated with the entity identifier for that entity are associated with the entity identifier.

FIG. 18 depicts one example of a system and method of group entity management which allows data records to belong to more than one entity. In the example shown in FIG. 18, data record "A" 1810a represents an initial data record having a plurality of attributes "bkt1", "bkt2", "bkt3", and "bkt4". In this example, attribute "bkt1" 1822 and attribute "bkt3" 1824 are used to determine a set of corresponding candidate data records "B" 1810b and "C" 1810c. Additional candidate data records can then be selected using transitive bucketing as described above with reference to FIG. 17. Specifically, in the example shown in FIG. 18, data record "D" 1810d is selected as a candidate data record using attribute "bkt4" 1826 of data record "B" 1810b. Note that attribute "bkt4" 1826 was not used in the selection of data record "B" 1810b. Likewise, attribute "bkt2" 1828 was not used in the selection of data record "C" 1810c, but attribute "bkt2" 1828 of data record "C" 1810c is used to select data record "F" 1810f as an additional candidate data record. This process is repeated and attribute "bkt3" 1832 and attribute "bkt4" 1834 of data record "F" 1810f are used to select yet another additional candidate data record "E" 1810e. Again, attribute "bkt3" 1832 and attribute "bkt4" 1834 were not used in the selection of data record "F" 1810f, but are used in the selection of data record "E" 1810e. Suppose now that no more candidate records can be found this way, the transitive bucketing process ends and the data records thus found are forwarded to a grouping mechanism or process.

FIG. 19 is a block diagram illustrating examples of group entities created after the transitive bucketing process of FIG. 18. More specifically, example data records "A" 1810a, "B" 1810b, "C" 1810c, "D" 1810d, "E" 1810e, and "F" 1810f from FIG. 18 are compared with one another. Based upon these comparisons, groups 1970, 1972, and 1974 are created. Here, group entity 1970 comprises data record "A" 1810a, data record "B" 1810b and data record "C" 1810c, meaning that data record "A" 1810a matches data record "B" 1810b with a score above the threshold, data record "A" 1810a matches data record "C" 1810c above the same threshold and data record "B" 1810b matches data record "C" 1810c above the same threshold. Group entity 1972 comprises data record "C" 1810c, data record "F" 1810f and data record "E" 1810e, meaning that data record "C" 1810c matches data record "F" 1810f with a score above a threshold, data record "C" 1810c matches data record "E" 1810e above the same threshold and data record "E" 1810e matches data record "F" 1810f above the same threshold. Note that here data record "C" 1810c belongs to two distinct groups. This is allowed and exemplifies that this grouping process is not a binary decision. Group entity 1974 comprises data record "D" 1810d, meaning that data record "D" 1810d did not match any of the other data records "A" 1810a, "B" 1810b, "C" 1810c, "E" 1810e, and "F" 1810f above a required threshold. This exemplifies that, although data record "D" 1810d is found through data record "B" 1810b (via attribute "bkt4" 1826), data record "D" 1810d may not be in the same group as data record "B" 1810b (and there is no guarantee that it would) if data record "D" 1810d does not match data record "B" 1810b above a certain predetermined threshold. As shown in FIG. 19, group entity 1974 comprises a single data record. In one embodiment, group entity 1974 may be referred to as a singleton.

These group entities 1970, 1972, and 1974 may be reconciled with other entities in the MEI described above and a set of corresponding entities may be created if they do not already exist as discussed above. For example, it may be determined if an entity which comprises any one of data record "A" 1810a, data record "B" 1810b or data record "C" 1810c and no other data record exists in the MEI. If such an entity exists and is associated with all the data records of the group (in this case, data record "A" 1810a, data record "B" 1810b and data record "C" 1810c), it may be left unaltered. Otherwise, any data records of the group not associated with the entity may then be associated with the entity. If no such entity exists, a new entity associated with data record "A" 1810a, data record "B" 1810b and data record "C" 1810c may be created. For example, if the entity is associated with data record "C" 1810c, data record "A" 1810a and data record "B" 1810b may then be associated with the entity. To continue with the example, it may then be determined if an entity which is associated with any one of data record "C" 1810c, data record "E" 1810e, or data record "F" 1810f and no other data record exists in the MEI. If such an entity exists and is associated with all the data records of the group (in this case, data record "C" 1810c, data record "E" 1810e, and data record "F" 1810f), it may be left unaltered. Otherwise, any data records of the group not associated with the entity may then be associated with the entity. If no such entity exists, a new entity associated with data record "C" 1810c, data record "E" 1810e, and data record "F" 1810f may be created. Assume here that no such entity exists and that therefore a new entity associated with data record "C" 1810c, data record "E" 1810e, and data record "F" 1810f is created. Note that at this point two entities exist where both of the entities are associated with data record "C" 1810c. Continuing with the example, it may be determined if an entity exists in the MEI corresponding to data record "D" 1810d, and if one does not exist, an entity associated with data record "D" 1810d is created.

Figure 20:
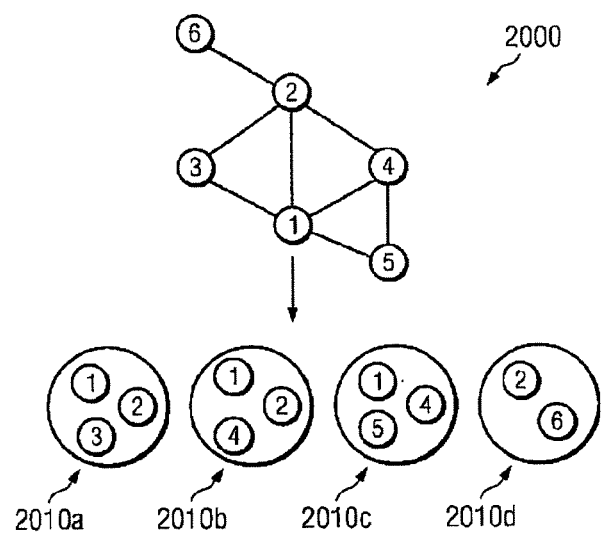
FIG. 20 depicts an example of a simple linkage among candidate data records, implementing embodiments of transitive bucketing and grouping processes.

FIG. 20 depicts an example of simple linkage among candidate data records, implementing embodiments of transitive bucketing and grouping processes described above. In this example, record "1" is associated or otherwise related to records "2", "3", "4", and "5", record "2" is associated or otherwise related to records "1", "3", "4", and "6", record "3"

is associated or otherwise related to records "1" and "2", record "4" is associated or otherwise related to records "1", "2", and "5", record "5" is associated or otherwise related to records "1" and "4", and record "6" is associated or otherwise related to record "2". Connected graph 2000 of candidate data records "1", "2", "3", "4", "5", and "6" is resolved into four group entities 2010*a*, 2010*b*, 2010*c*, and 2010*d* by comparing them with one another. If a comparison between two records scores above a predetermined threshold, then they are said to have a hard link and are placed in the same group. Note that this is not a binary decision and a data record is allowed to participate in more than one group entities. In this case, group entity 2010*a* comprises records "1", "2", and "3", group entity 2010*b* comprises records "1", "2", and "4", group entity 2010*c* comprises records "1", "4", and "5", and group entity 2010*d* comprises records "2" and "6". Notice that record "1" participates in group entities 2010*a*, 2010*b*, and 2010*c*, record "2" participates in group entities 2010*a*, 2010*b*, and 2010*d*, and record "4" participates in group entities 2010*b* and 2010*c*.

Figure 21:
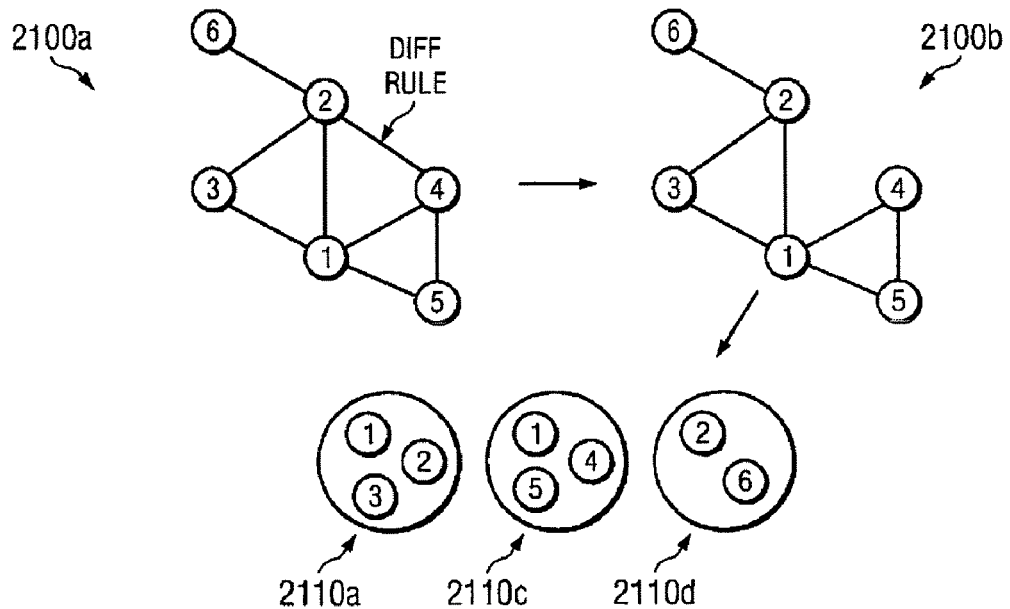
FIG. 21 depicts an example illustrating what happens when a Diff rule is introduced to the simple linkage example of FIG. 20.

FIG. 21 depicts an example illustrating what happens when a non-identity rule (referred to herein as "DIFF RULE") is introduced to the simple linkage example of FIG. 20. Initially, connected graph 2100*a* of candidate data records "1", "2", "3", "4", "5", and "6" is the same as connected graph 2000 described above. However, the introduction of a non-identity rule changes the relationship between records "2" and "4", resulting connected graph 2100*b* and group entities 2110*a*, 2110*c*, and 2110*d*.

Figure 22:
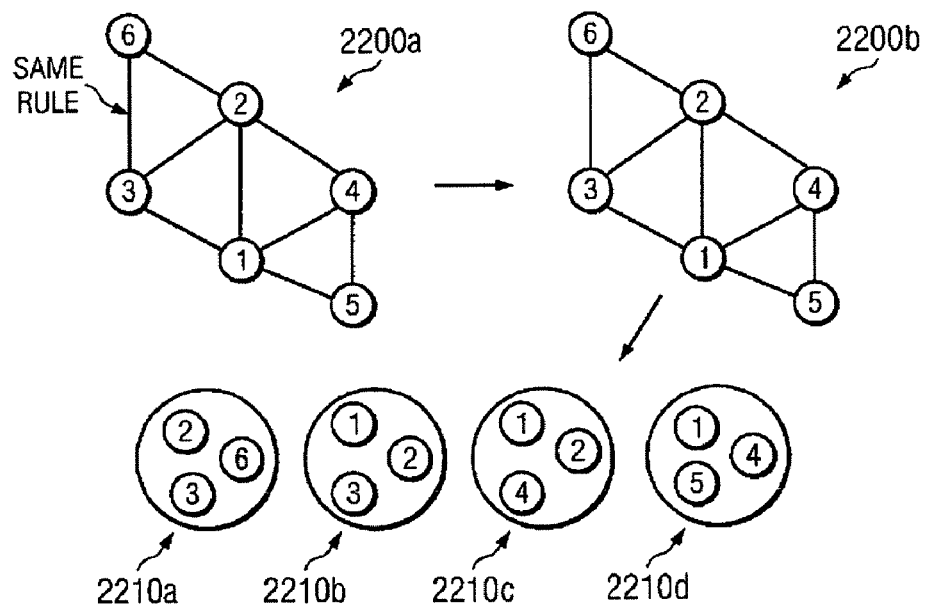
FIG. 22 depicts an example illustrating what happens when a Same rule is introduced to the simple linkage example of FIG. 20.

FIG. 22 depicts an example illustrating what happens when an identity rule (referred to herein as "SAME RULE") is introduced to the simple linkage example of FIG. 20. Initially, connected graph 2200*a* of candidate data records "1", "2", S"3" "4", "5", and "6" is the same as connected graph 2000 described above. However, the introduction of an identity rule changes the relationship between records "3" and "6", resulting connected graph 2200*b* and group entities 2210*a*, 2210*b*, 2210*c*, and 2210*d*. In this case, group entity 2210*a* comprises records "2", "3", and "6", group entity 2210*b* comprises records "1", "2", and "3", group entity 2210*c* comprises records "1", "2", and "4", and group entity 2210*d* comprises records "1", "4" and "5".

Embodiments of a system and method for group entity management as described above can relax the constraint that a member record must exist in only one entity and allow for more complex relationship modeling of data records. In some embodiments, rules can be utilized to handle exceptions, perhaps providing an overwrite capability where necessary, facilitating even more flexibility to the modeling of group relationships. Specifically, embodiments of a system and method for group entity management as described above allow for the manipulation of many-to-many relationships as well as the discovery of non-obvious relationships. As described above, this can be done by transitive bucketing in which a bridge member who is associated with more than one bucket can act as a bridge between two or more otherwise non-related member sets.

In the foregoing specification, the invention has been described with reference to specific embodiments. However, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the scope of the invention as set forth in the following claims and their legal equivalents.

What is claimed is:

1. A method for managing entities in a master entity index system, comprising:
determining a set of candidate data records based on at least one attribute of an initial data record;
performing a transitive bucketing process to determine additional candidate data records based on selective attributes of the set of candidate data records;
repeating the transitive bucketing process with a set of selective attributes of the additional candidate data records determined in a preceding iteration of the transitive bucketing process until no more candidate data records are returned, wherein the set of selective attributes for a repeated iteration of the transitive bucketing process is different than the set of selective attributes for the preceding iteration;
resolving the initial data record, the set of candidate data records, and any additional candidate data records determined via the transitive bucketing process into group entities; and
reconciling the group entities with entities in the master entity index system.

2. The method of claim 1, further comprising receiving the initial data record and a set of attributes associated therewith, wherein the set of attributes includes the at least one attribute.

3. The method of claim 1, further comprising comparing the initial data record, the set of candidate data records, and any additional candidate data records determined via the transitive bucketing process.

4. The method of claim 3, further comprising generating an associated score indicating a confidence level or likelihood to match between two data records selected from the group consisting of the initial data record, the set of candidate data records, and any additional candidate data records determined via the transitive bucketing process.

5. The method of claim 1, wherein each of the group entities comprises at least one data record and wherein, for each of the group entities having two or more data records, the two or more data records match one another above a predetermined threshold.

6. The method of claim 1, wherein the selective attributes of the set of candidate data records utilized in determinining the additional candidate data records are different from the at least one attribute of the initial data record utilized in determining the set of candidate data records.

7. The method of claim 1, wherein each of the set of candidate data records has an attribute value that exactly matches a value of the at least one attribute of the initial data record.

8. The method of claim 1, further comprising introducing a rule to change a relationship between two data records selected from the group consisting of the initial data record, the set of candidate data records, and any additional candidate data records determined via the transitive bucketing process.

9. The method of claim 1, wherein at least one data record selected from the group consisting of the initial data record, the set of candidate data records, and any additional candidate data records determined via the transitive bucketing process participates in two or more of the group entities.

10. A computer-readable storage medium carrying computer-readable instructions executable by a processor to implement a method for managing entities in a master entity index system, the method comprising:

determining a set of candidate data records based on at least one attribute of an initial data record;

performing a transitive bucketing process to determine additional candidate data records based on selective attributes of the set of candidate data records;

repeating the transitive bucketing process with a set of selective attributes of the additional candidate data records determined in a preceding iteration of the transitive bucketing process until no more candidate data records are returned, wherein the set of selective attributes for a repeated iteration of the transitive bucketing process is different than the set of selective attributes for the preceding iteration;

resolving the initial data record, the set of candidate data records, and any additional candidate data records determined via the transitive bucketing process into group entities; and reconciling the group entities with entities in the master entity index system.

11. The computer-readable storage medium of claim 10, wherein the computer-readable instructions are further executable by the processor to compare the initial data record, the set of candidate data records, and any additional candidate data records determined via the transitive bucketing process and generate an associated score indicating a confidence level or likelihood to match between one another.

12. The computer-readable storage medium of claim 10, wherein each of the group entities comprises at least one data record and wherein, for each of the group entities having two or more data records, the two or more data records match one another above a predetermined threshold.

13. The computer-readable storage medium of claim 10, wherein the selective attributes of the set of candidate data records utilized in determining the additional candidate data records are different from the at least one attribute of the initial data record utilized in determining the set of candidate data records.

14. The computer-readable storage medium of claim 10, wherein each of the set of candidate data records has an attribute value that exactly matches a value of the at least one attribute of the initial data record.

15. The computer-readable storage medium of claim 10, wherein the computer-readable instructions are further executable by the processor to change a relationship between two data records selected from the group consisting of the initial data record, the set of candidate data records, and any additional candidate data records determined via the transitive bucketing process.

16. The computer-readable storage medium of claim 10, wherein at least one data record selected from the group consisting of the initial data record, the set of candidate data records, and any additional candidate data records determined via the transitive bucketing process participates in two or more of the group entities.

17. A system, comprising:
a processor; and
a computer-readable storage medium accessible by the processor and carrying computer-readable instructions executable by the processor to implement a method for managing entities in the system, the method comprising:
determining a set of candidate data records based on at least one attribute of an initial data record;

performing a transitive bucketing process to determine additional candidate data records based on selective attributes of the set of candidate data records;

repeating the transitive bucketing process with a set of selective attributes of the additional candidate data records determined in a preceding iteration of the transitive bucketing process until no more candidate data records are returned, wherein the set of selective attributes for a repeated iteration of the transitive bucketing process is different than the set of selective attributes for the preceding iteration;

resolving the initial data record, the set of candidate data records, and any additional candidate data records determined via the transitive bucketing process into group entities; and reconciling the group entities with entities in the system.

18. The system of claim 17, where the group entities are generated on the fly or persisted in a data store accessible by the processor.

19. The system of claim 17, wherein each of the group entities comprises at least one data record and wherein, for each of the group entities having two or more data records, the two or more data records match one another above a predetermined threshold.

20. The system of claim 17, wherein at least one data record selected from the group consisting of the initial data record, the set of candidate data records, and any additional candidate data records determined via the transitive bucketing process participates in two or more of the group entities.

21. The method of claim 1, wherein the group entities are generated on the fly or persisted in a data store.

22. The computer-readable storage medium of claim 10, wherein the computer-readable instructions are further executable by the processor to receive the initial data record and a set of attributes associated therewith, wherein the set of attributes includes the at least one attribute.

23. The computer-readable storage medium of claim 10, wherein the group entities are generated on the fly or persisted in a data store.

24. The system of claim 17, wherein the method further comprises receiving the initial data record and a set of attributes associated therewith, wherein the set of attributes includes the at least one attribute.

25. The system of claim 17, wherein the method further comprises comparing the initial data record, the set of candidate data records, and any additional candidate data records determined via the transitive bucketing process and generating an associated score indicating a confidence level or likelihood to match between one another.

26. The system of claim 17, wherein the selective attributes of the set of candidate data records utilized in determining the additional candidate data records are different from the at least one attribute of the initial data record utilized in determining the set of candidate data records.

27. The system of claim 17, wherein each of the set of candidate data records has an attribute value that exactly matches a value of the at least one attribute of the initial data record.

28. The system of claim 17, wherein the method further comprises changing a relationship between two data records selected from the group consisting of the initial data record, the set of candidate data records, and any additional candidate data records determined via the transitive bucketing process.

* * * * *